US009327617B2

(12) United States Patent
Goeckel et al.

(10) Patent No.: US 9,327,617 B2
(45) Date of Patent: May 3, 2016

(54) WHEELCHAIR BACK MOUNTING ASSEMBLY

(71) Applicants: Gregory W. Goeckel, Belleville, IL (US); Jeffrey A. Bee, St. Louis, MO (US); David K. Parsons, Swansea, IL (US)

(72) Inventors: Gregory W. Goeckel, Belleville, IL (US); Jeffrey A. Bee, St. Louis, MO (US); David K. Parsons, Swansea, IL (US)

(73) Assignee: Roho, Inc., Belleville, IL (US)

( * ) Notice: Subject to any disclaimer, the term of this patent is extended or adjusted under 35 U.S.C. 154(b) by 243 days.

(21) Appl. No.: 14/039,370

(22) Filed: Sep. 27, 2013

(65) Prior Publication Data
US 2014/0021763 A1 Jan. 23, 2014

Related U.S. Application Data

(63) Continuation of application No. 13/055,834, filed as application No. PCT/US2009/052677 on Aug. 4, 2009, now Pat. No. 8,590,977.

(60) Provisional application No. 61/086,994, filed on Aug. 7, 2008, provisional application No. 61/097,574, filed on Sep. 17, 2008.

(51) Int. Cl.
*B60N 2/22* (2006.01)
*A61G 5/10* (2006.01)
*B60N 2/44* (2006.01)
*A61G 5/12* (2006.01)

(52) U.S. Cl.
CPC ............... *B60N 2/22* (2013.01); *A61G 5/1067* (2013.01); *B60N 2/44* (2013.01); *A61G 2005/122* (2013.01); *A61G 2210/10* (2013.01)

(58) Field of Classification Search
CPC ........... B60N 2/22; B60N 2/44; A61G 5/1067
USPC .......................................... 297/440.2, DIG. 4
See application file for complete search history.

(56) References Cited

U.S. PATENT DOCUMENTS

| | | | |
|---|---|---|---|
| 5,556,168 | A | 9/1996 | Dinsmoor, III et al. |
| D407,353 | S | 3/1999 | Bar et al. |
| D408,767 | S | 4/1999 | Bar et al. |
| D412,685 | S | 8/1999 | Bar et al. |
| D413,085 | S | 8/1999 | Bar et al. |
| D413,841 | S | 9/1999 | Bar et al. |
| 6,095,611 | A | 8/2000 | Bar et al. |
| 6,474,743 | B1 | 11/2002 | Harker et al. |
| 7,188,902 | B1 | 3/2007 | Chen |
| 7,980,580 | B2 * | 7/2011 | Loewenthal ............. A61G 5/12 297/440.2 |
| 2004/0066081 | A1 | 4/2004 | Dennon |
| 2008/0157581 | A1 * | 7/2008 | Whelan ................ A61G 5/1067 297/440.2 X |

OTHER PUBLICATIONS

International Search Report from related International Application No. PCT/US2009/052677, dated Feb. 2, 2010.

* cited by examiner

*Primary Examiner* — Anthony D Barfield
(74) *Attorney, Agent, or Firm* — Tara A. Nealey; Polsinelli PC

(57) ABSTRACT

An adjustment apparatus for a wheelchair back that can be used with various backs, that can be adjusted in a plurality of ways using a single adjustment point, and that can be adjusted without the use of tools. In another aspect, includes a support mechanism for mounting an adjustment apparatus for a wheelchair back that can be engaged using gravity, that provides at least one support point, and that can be utilized without the use of tools. Still another aspect of the wheelchair back assembly includes a mounting clamp that is simple in construction, that provides at least one support point, and that can be easily disassembled and adjusted to accommodate upright frame members of various diameters without the use of a tool.

11 Claims, 18 Drawing Sheets

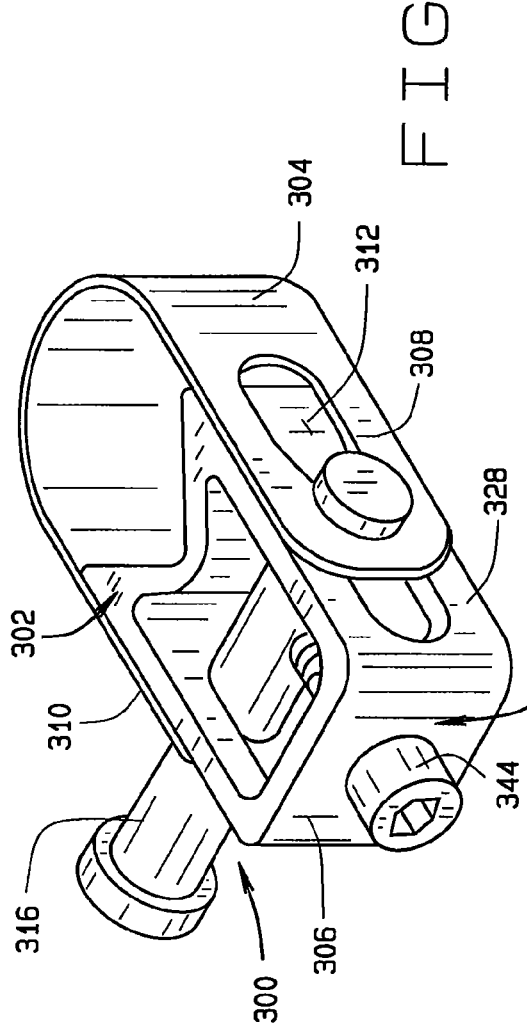
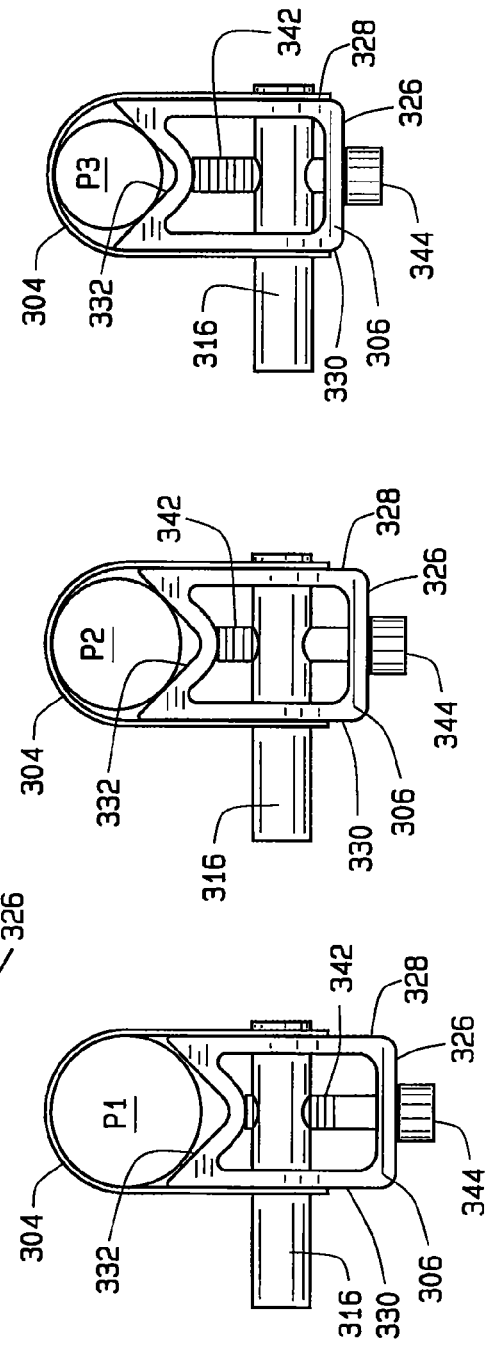
FIG. 10
FIG. 11A  FIG. 11B  FIG. 11C

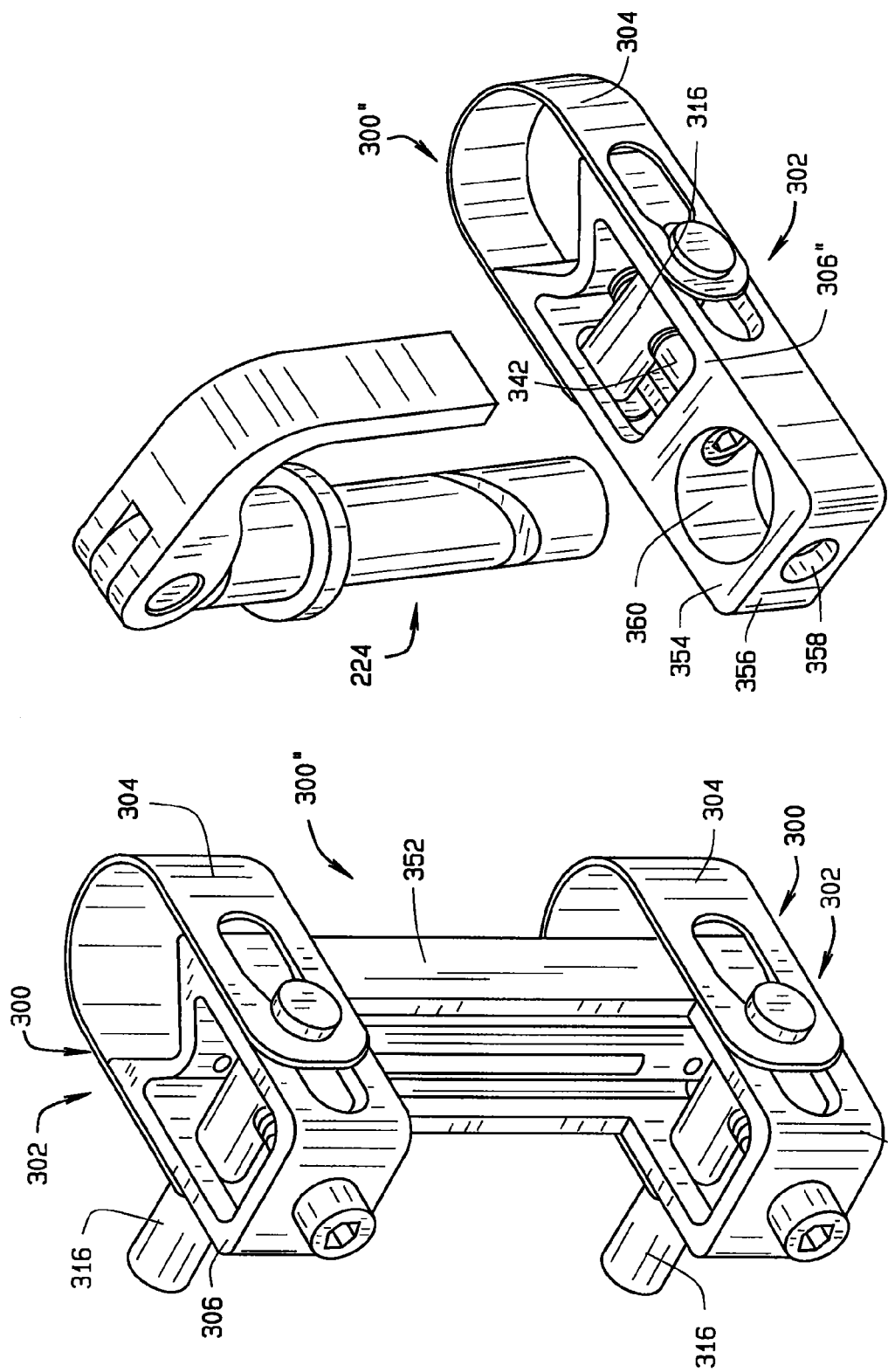

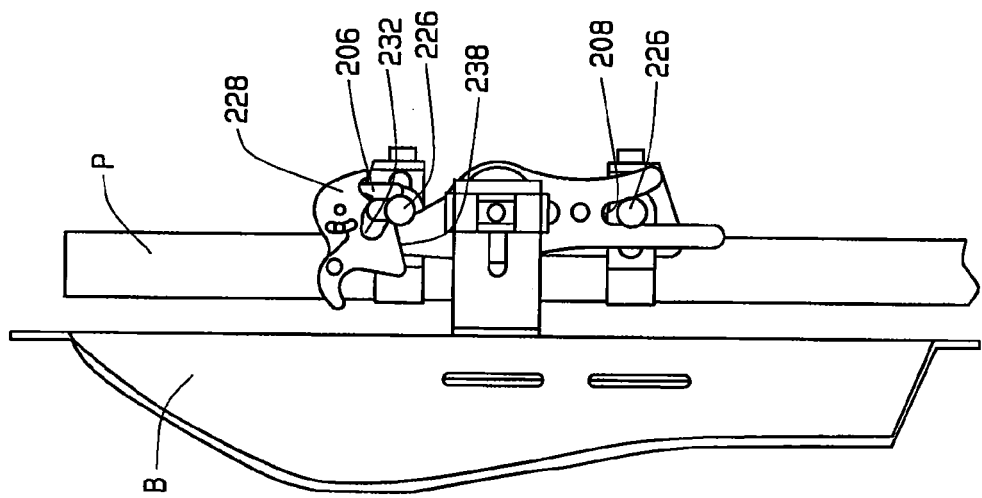
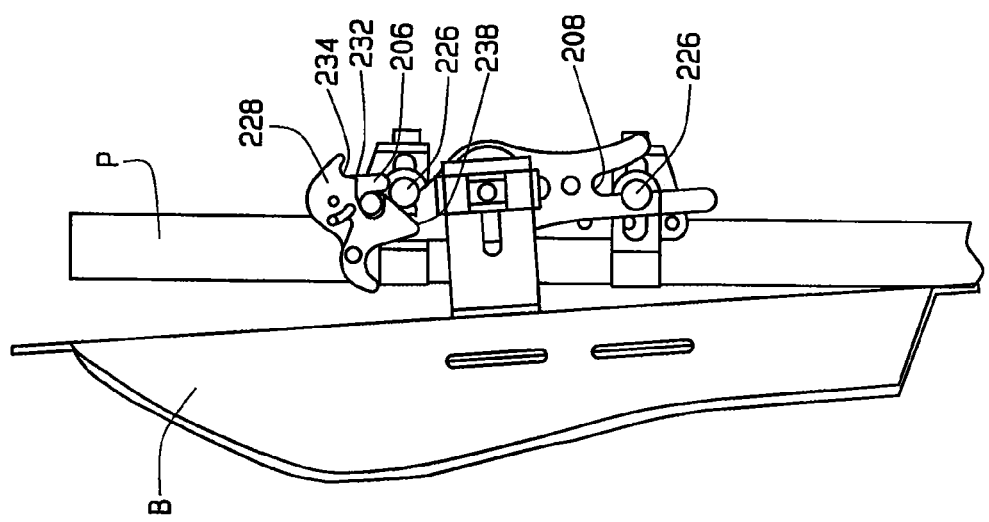

WHEELCHAIR BACK MOUNTING ASSEMBLY

CROSS REFERENCE TO RELATED APPLICATIONS

This application is continuation of application Ser. No. 13/055,834, filed Mar. 10, 2011, now U.S. Pat. No. 8,590,977, which is a Section 371application of PCT Application No. PCT/US2009/052677 filed Aug. 4, 2009, which claims the benefit of U.S. provisional application Nos. 61/086,994 filed Aug. 7, 2008 and 61/097,574filed Sep. 17, 2008, all of which are incorporated herein in their entirety by reference.

BACKGROUND OF THE INVENTION

The invention relates generally to mounting assemblies to secure wheelchair back supports to the canes or posts of wheelchairs. In one aspect, the mounting assembly includes an adjustment mechanism having a single adjustment point which allows for changing a plurality of positions of the back. In another aspect, the mounting assembly includes a gravity-driven latch for attaching the mounting assembly to a support point or support post on the wheel chair post. In a further aspect, the mounting assembly includes a mounting clamp support assembly from which the support post extends. Wheelchairs generally comprise a frame with surface engaging wheels, a seating surface and a back support. The frame usually is made from tubular steel or the like. The seat and back can be a more pliant or flexible material such as vinyl or canvas for example. The frame includes two spaced apart upright members behind the seat, sometime referred to as posts or canes. The back support usually is suspended in a generally vertical orientation between the posts.

In many cases the original back support does not provide sufficient or appropriate support, or is not positioned in between the wheel chair posts, to meet the seated user's specific physical needs or tastes. The user may replace the original equipment back support with another back support, for example a more versatile or adjustable back support or one that is more rigid or firmer. These back supports can be attached to the original equipment posts or the posts can be removed and the replacement back installed.

Known back rests and mounting assemblies for back rests are complex and do not always allow for simple adjustment of the back rest, for example, without a tool. They generally include a back and do not provide for a mounting assembly that can be used to mount different back supports between the wheel chair posts. Moreover, they generally have a number of different adjustment points that must be operated to vary the angular position, vertical position and horizontal position or location of the back relative to the seat. It would be advantageous, therefore, to have a mounting assembly for a wheelchair back that can be used with different backs, that can allows for adjustment of the back in a plurality of ways using a single adjustment point and that can be adjusted without the use of tools.

Also, currently available mounting assemblies for the wheel chair back rests do not allow for attachment to supports of wheelchair posts without a tool. Additionally, currently available mounting assemblies do not allow for the mounting assembly to be securely connected to the supports of the wheelchair posts when the mounting assembly is not locked or fastened to the support posts. Therefore, it would be advantageous to have a mounting assembly for a wheelchair back that can be used without a tool and that can be securely connected to supports of wheelchair posts even in an unlocked position.

The mounting clamps of wheelchair posts of the prior art generally do not provide multiple support locations for the mounting assembly in a single clamp. They generally require the use of multiple clamps per wheelchair post in order to adequately support the back rests and mounting apparatus for back rests. Moreover, they do not always allow for adjustment without a tool or adjustment to fit wheelchair posts of different sizes.

SUMMARY OF THE INVENTION

A mounting assembly is provided to mount a wheelchair back between the posts or canes of a wheel chair. The mounting assembly can be used with different wheelchair backs, and allows for adjustment of at least the angular and horizontal position of the wheelchair back relative to the wheelchair posts using a single adjustment point and without the use of tools. In another aspect, the mounting assembly includes a support mechanism for mounting the wheelchair back to support posts or pins extending from the wheelchair posts. The support mechanism is operable without the use of tools, and allows for one-handed attachment of the wheelchair back to the wheelchair posts and one-handed removal of the wheelchair back from the wheelchair posts. In still another aspect, a mounting clamp which is secured to the wheelchair posts and from which the support pin extends is provided that is simple in construction, that provides at least one support point, and that can be easily disassembled and adjusted to accommodate upright frame members of various diameters with or without the use of a tool.

In accordance with one aspect of the invention, the mounting assembly includes an adjustment apparatus which allows for selective adjustment of at least the angular (or tilt) and horizontal positions of the wheelchair back. In accordance with this aspect, the mounting assembly includes a bracket connectable to a surface of a wheelchair back and a support connected to the bracket assembly to be rotatable relative to the bracket assembly. The support is adapted to be removably mounted to the post of a wheelchair. The mounting assembly further includes a tilt assembly for adjusting the angular orientation of one of the support and the wheelchair back relative to the other, a slide mechanism for adjusting the position of one of the support and the wheelchair back relative to the other along a generally horizontal path, and a single adjustment mechanism operatively connecting the tilt assembly and the slide mechanism to the bracket. Operation of the single adjustment mechanism allows for operation of both the tilt mechanism and the slide mechanism to selectively adjust the angular and horizontal position of the wheelchair back. In a preferred embodiment, the single adjustment mechanism comprises a fastener.

The tilt mechanism comprises an inner disk having an inner surface, an outer surface, and a hole through which the fastener extends. The support operatively engages the outer surface of the inner disk such that the support can rotate with respect to the inner disk when the fastener is in a loosened position. In one embodiment, the tilt mechanism comprises an outer disk having an outer surface, an inner surface, and a hole through which the fastener extends. The outer surface of the inner disk faces the inner surface of the outer disk and an inner surface of the support faces the outer surface of the outer disk such that the inner disk can rotate with respect to the outer disk when the fastener is in a loosened position. Preferably, the outer surface of the inner disk, and the inner surface of the support, or of the second disk, are textured. The texturing of the facing surfaces is complementary, and shaped such that when the facing surfaces are in an abutting relationship, rotation of the support and the inner disk relative to each other is substantially prevented. Further, the outer surface of the bracket and the inner surface of the inner disk are also textured, the texturing being complementary, and shaped such that when the facing surfaces are in an abutting relationship, rotation of the inner disk and the bracket relative to each other is substantially prevented.

A biasing element can be located between the first disk and the second disk (or between the first disk and the support) whereby when the fastener is in the loosened position the biasing element separates the inner and out disks (or the inner disk and the support) to disengage the textured surfaces to allow rotation of the support and the inner disk relative to each other. The bracket comprises a forward wall, a rear wall, and an opening in the forward wall through which the fastener extends, the forward wall of the bracket facing the inner surface of the inner disk. A brace is positioned on a back side of the bracket forward wall opposite the inner disk. The brace includes an opening which threadedly receives the fastener.

The bracket opening comprises an elongate slot; the slide mechanism comprising the slot. The horizontal position of the inner disk relative to the bracket can be selectively set when the fastener is in the loosened position. In another aspect of the invention, the mounting assembly includes a hanger arm having a hook defining an upper support point and a self-locking latch pivotally mounting to the hanger arm. The hook is a downwardly opening hook. The latch defines a locking notch and is pivotal between a locked position in which the latch locking notch and the hook define a substantially closed hole and an unlocked position in which the hanger arm hook can be connected to or removed from the wheelchair post support pin. The latch is shaped and weighted such that the latch will move to the locked position under the force of gravity. The latch can be moved from the locked position to the open position without the use of a tool. The latch further comprises a handle member which is graspable to pivot the latch from the locked position to the unlocked position while the latch is engaged with the hanger arm hook.

The latch comprises an attachment surface extending from an end of the locking notch. The attachment surface is offset from both the vertical and horizontal when the latch is in the locked position, such that when the attachment surface engages the support pin, the latch will pivot from the locked position to enable the hanger arm hook to engage the support pin.

In accordance with a further aspect of the support mechanisms, the latch includes a second notch positioned to be generally aligned with the hanger arm hook when the latch is in the unlocked position. The hook still securely engages the wheelchair post support pin against inadvertent removal of the wheelchair back when the latching mechanism is in the unlocked position.

In accordance with a further aspect, a mounting clamp assembly is provided from which the support post/pin extends. The mounting clamp assembly comprises a clamp block, a flexible band, a pin extending through the clamp block and a fastener. The clamp block has a rear surface defining a hole, a forward surface, a first side surface and a second side surface. The first and second side surfaces having aligned openings. The band has opposed arms with openings in functional alignment with the openings in the first and second side surfaces of the clamp block. The band extends around the forward surface of the clamp block to define a space between the clamp block forward surface and the band. The pin extends through the aligned openings of the band and clamp block. The pin has a bore in functional alignment with the hole in the rear surface of the clamp block. The clamp fastener extends through the clamp block rear surface hole and is operatively engaged with the bore of the pin. At least one of the pin bore and the hole in the rear surface of the clamp block is threaded, such that rotation of the fastener in a first direction draws the band toward the forward surface of the clamp block to reduce the size of the space between the band and the clamp block forward surface in order to secure an object between the band and the forward surface of the clamp block; and rotation of the fastener in an opposite direction moves the band away from the forward surface of the block. In one embodiment, the clamp pin has a length greater than a width of the clamp block, such that one end of the pin extends beyond one of the side surfaces when the pin is received in the block to define the support post. In another embodiment, the support post comprises a post separate from the pin and which extends from one of the side surfaces of the clamp block.

In a further variation of the clamp assembly, the clamp assembly includes a second point of support. In accordance with this variation, the clamp assembly can include elongated extension member extending downwardly from the clamp block. The extension member has a forward surface shaped complimentary to, and which is flush with, the clamp block forward surface, such that the extension member lengthens the forward surface of the clamp block. The second support post is positioned at a lower end of the extension member, the second point of support comprising the second support post. In one embodiment, the clamp assembly includes a lower clamp block, and the second support post extends from the lower clamp block.

BRIEF DESCRIPTION OF THE DRAWINGS

FIG. 10 is a perspective view of an illustrative embodiment of the mounting clamp;

FIGS. 11A-11C are top plan views of the mounting clamp of FIG. 10 attached to posts of decreasing diameters to demonstrate the versatility of the clamp;

FIG. 16 is a perspective view of a dual mounting clamp assembly which provides two support posts;

FIG. 17 is a perspective view of another illustrative embodiment of the mounting clamp for use with a quick release mechanism;

FIG. 20 is a side view of the mounting assembly in a partially engaged state with the mounting clamp support post, with the latching mechanism being rotated to a position to allow a hanger arm of the support assembly to engage the mounting clamp;

FIG. 21 is a further side view of the mounting assembly in a partially and further engaged state with the support assembly hanger arm engaging the support post and the latching mechanism rotating to a locked position under the force of gravity alone;

Corresponding reference numbers indicate corresponding structures throughout the various figures.

DETAILED DESCRIPTION

Figure 3:
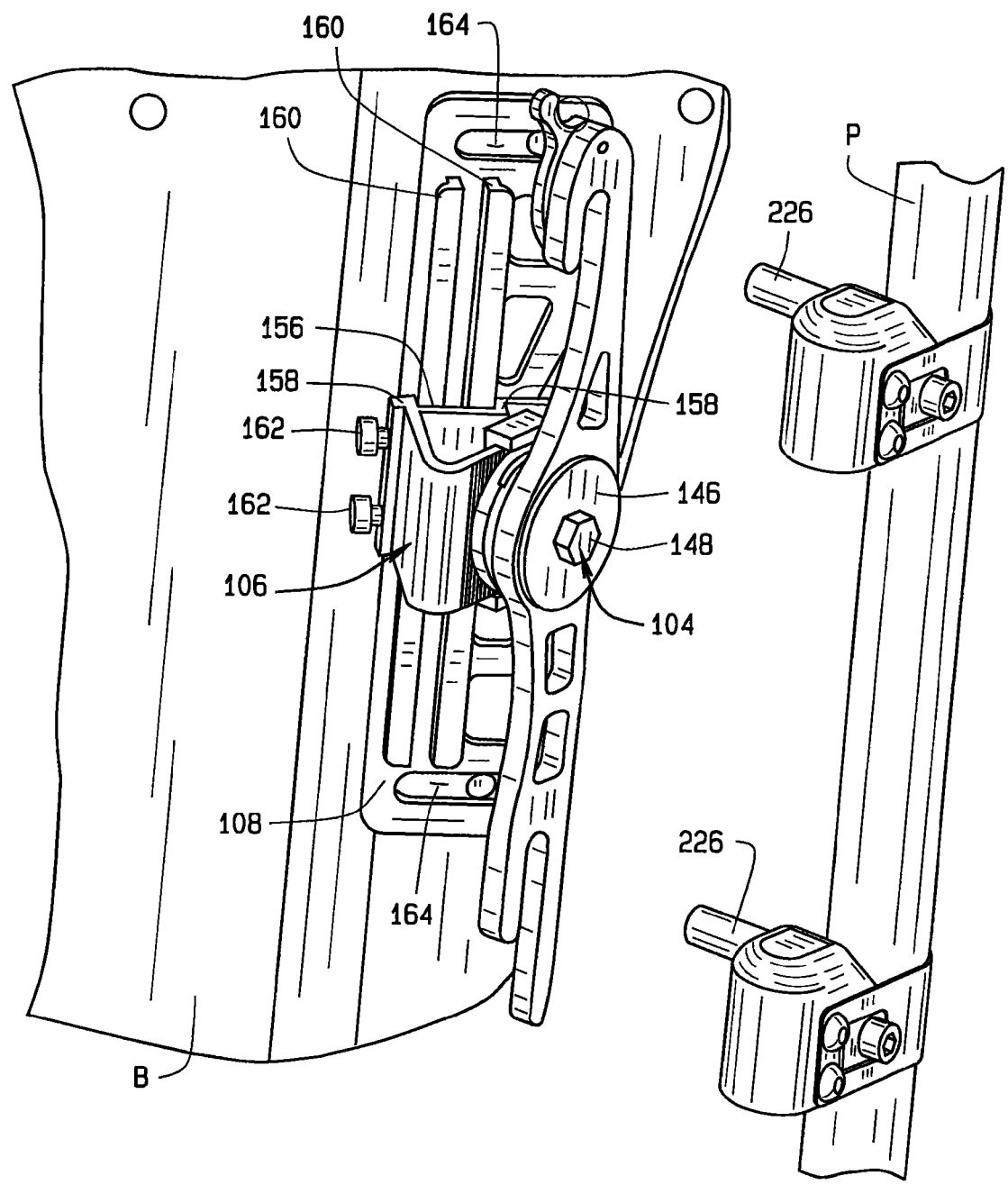
FIG. 3 is a perspective view of a wheelchair back mounting assembly employing a second illustrative embodiment of the mounting assembly comprising a plate to facilitate vertical adjustment.
Figure 4:
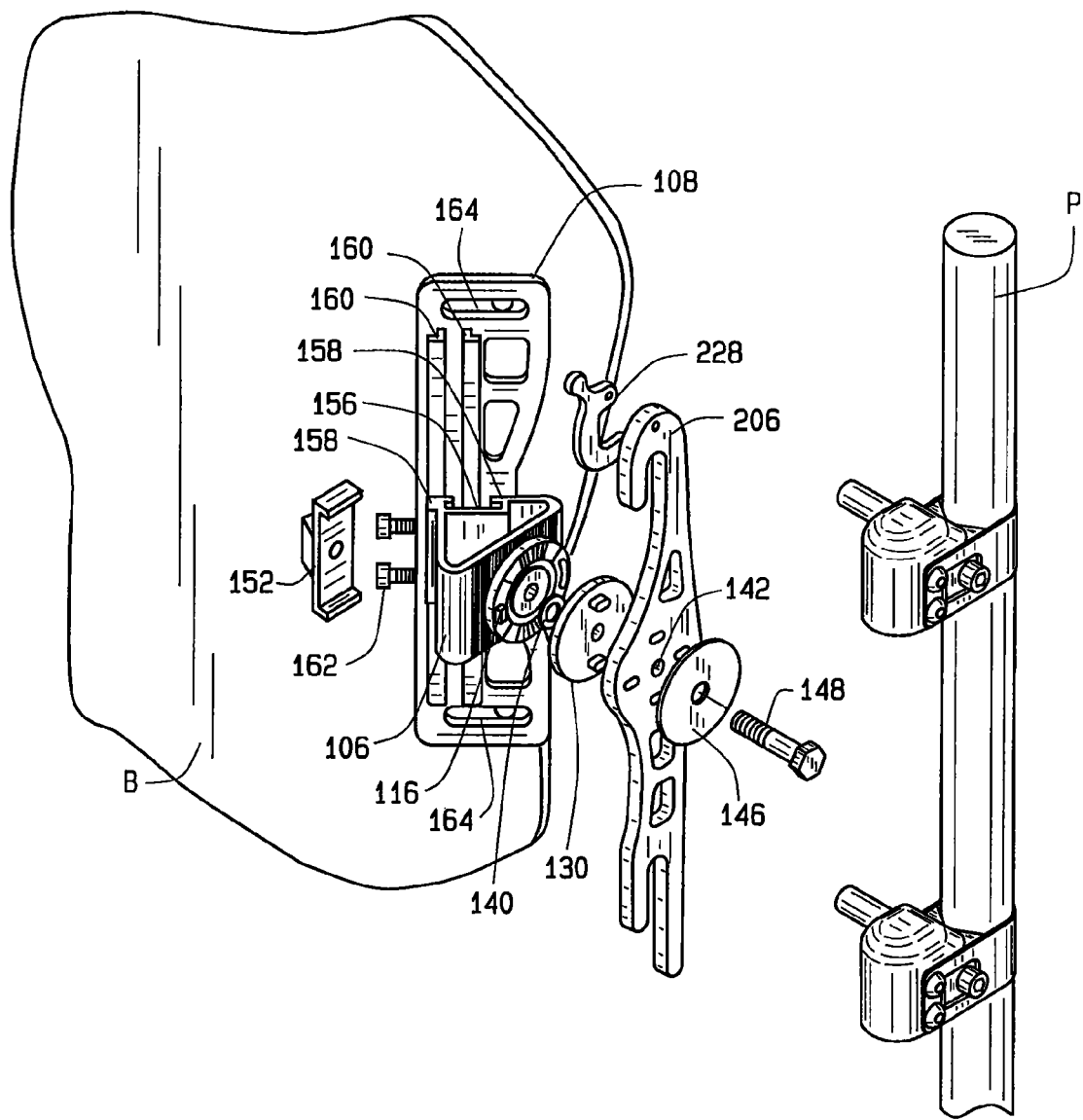
FIG. 4 is an exploded view of the mounting assembly of FIG. 3.
Figure 25:
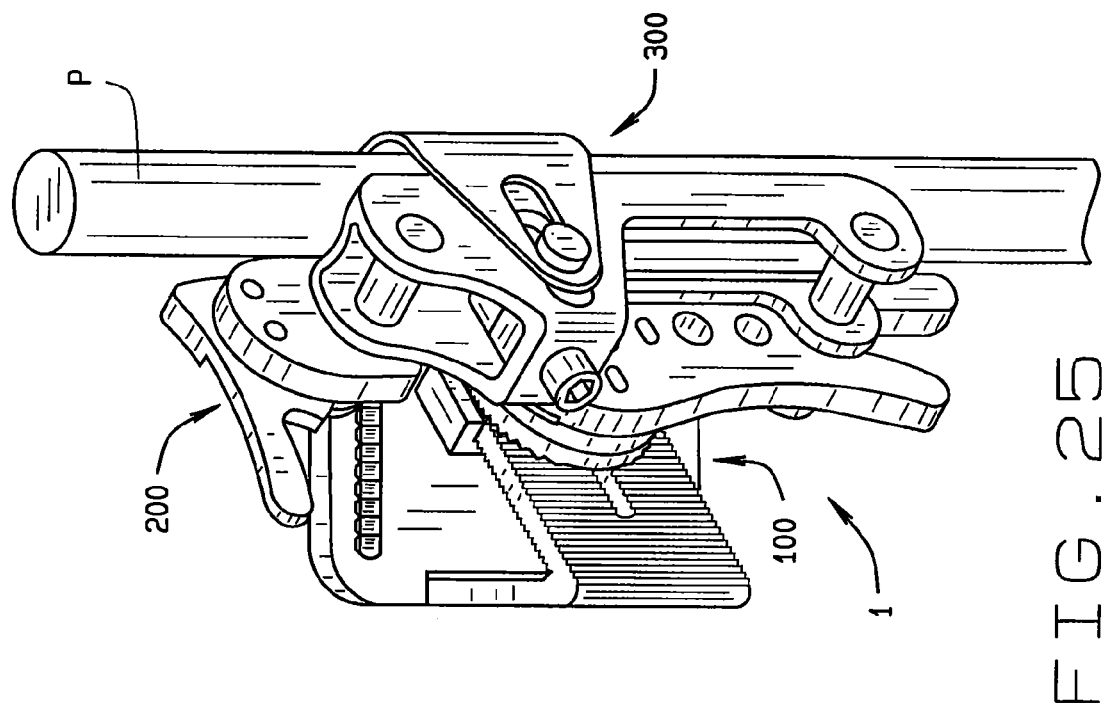
FIG. 25 is a perspective view of a wheelchair back mounting assembly.
Figure 26:
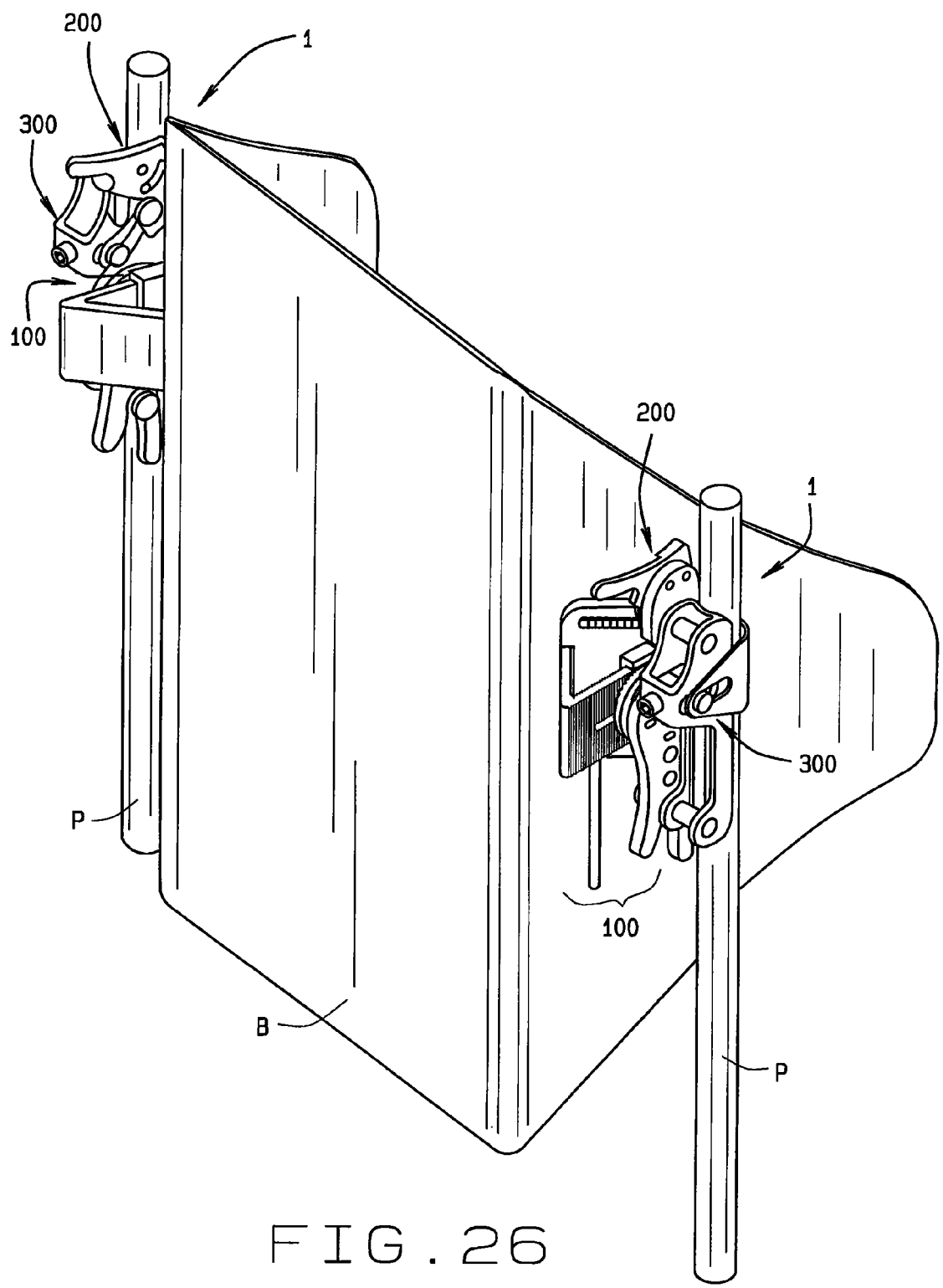
FIG. 26 is a perspective view of a wheelchair back with two wheelchair back mounting assemblies and associated clamp assemblies shown attached to opposing wheelchair posts.

Referring initially to FIGS. 1, 2, 25, and 26, a wheelchair back mounting assembly 1 is shown attached to a side surface of a wheelchair back B. It will be understood that a second wheelchair back mounting assembly 1 (which is a mirror image of the mounting assembly 1 shown in FIG. 1) would be attached to the opposite side surface of wheelchair back B (as shown in FIG. 26). Although not shown, in use the back B could have some type of cushion, for example a foam cushion or air cell cushion secured to a front surface of the back B. The wheelchair back mounting assembly 1 includes an adjustment apparatus 100 and a support mechanism 200. An associated mounting clamp 300 is mounted to the wheel chair post P. As seen in FIGS. 3 and 4, the mounting assembly 1 mounts wheelchair frame back canes or posts P so as to suspend the wheelchair back B on the wheelchair frame above and behind the wheelchair seat (not shown). The construction and arrangement of a wheelchair frame and posts P are illustrated generally in use with a wheelchair back in U.S. Pat. No. 5,364,162, which is incorporated herein by reference.

Figure 1:
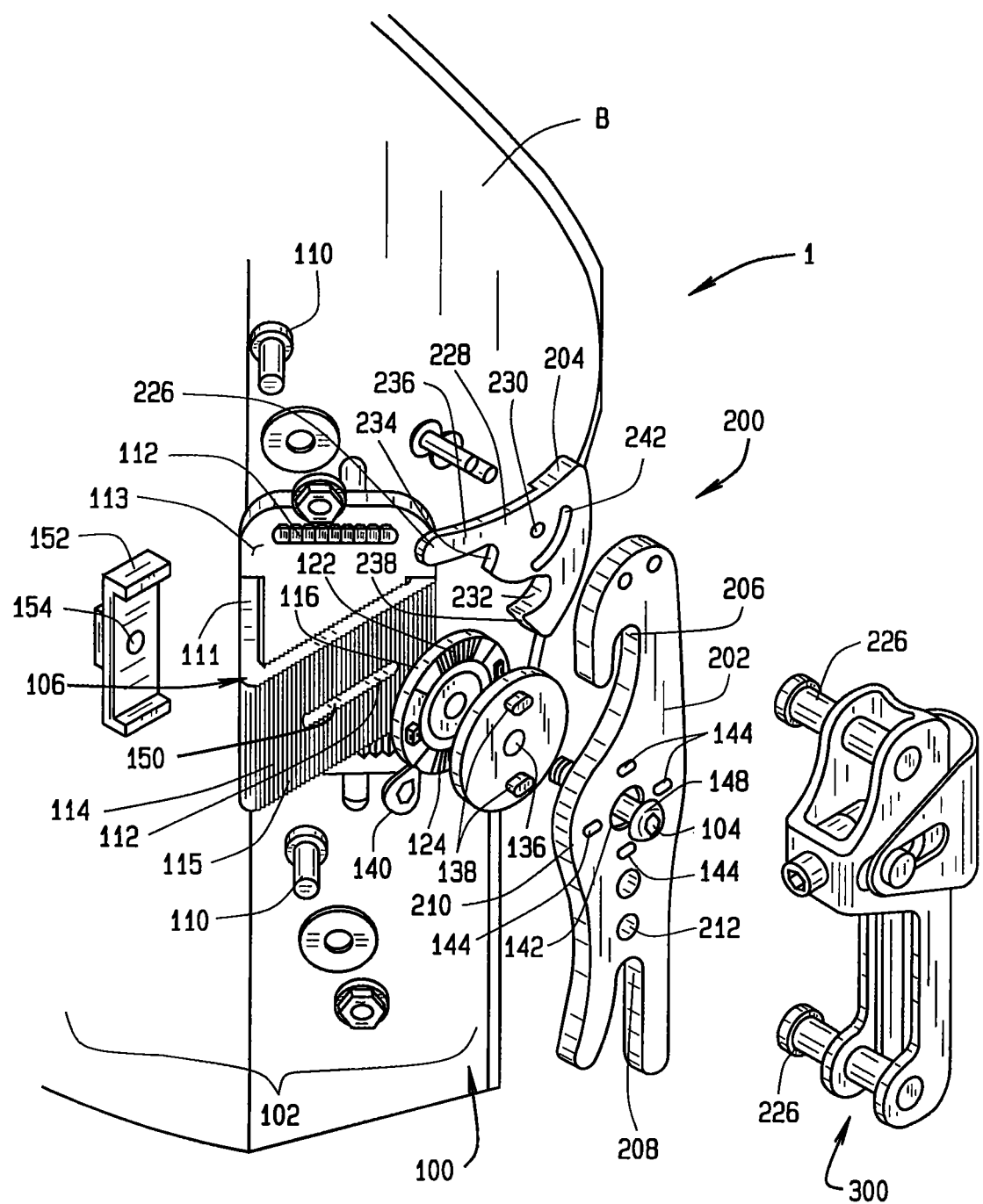
FIG. 1 is a perspective, exploded view of an illustrative embodiment of a wheelchair back mounting assembly and associated clamp assembly; the mounting assembly including an adjustment apparatus and a support assembly.
Figure 2:
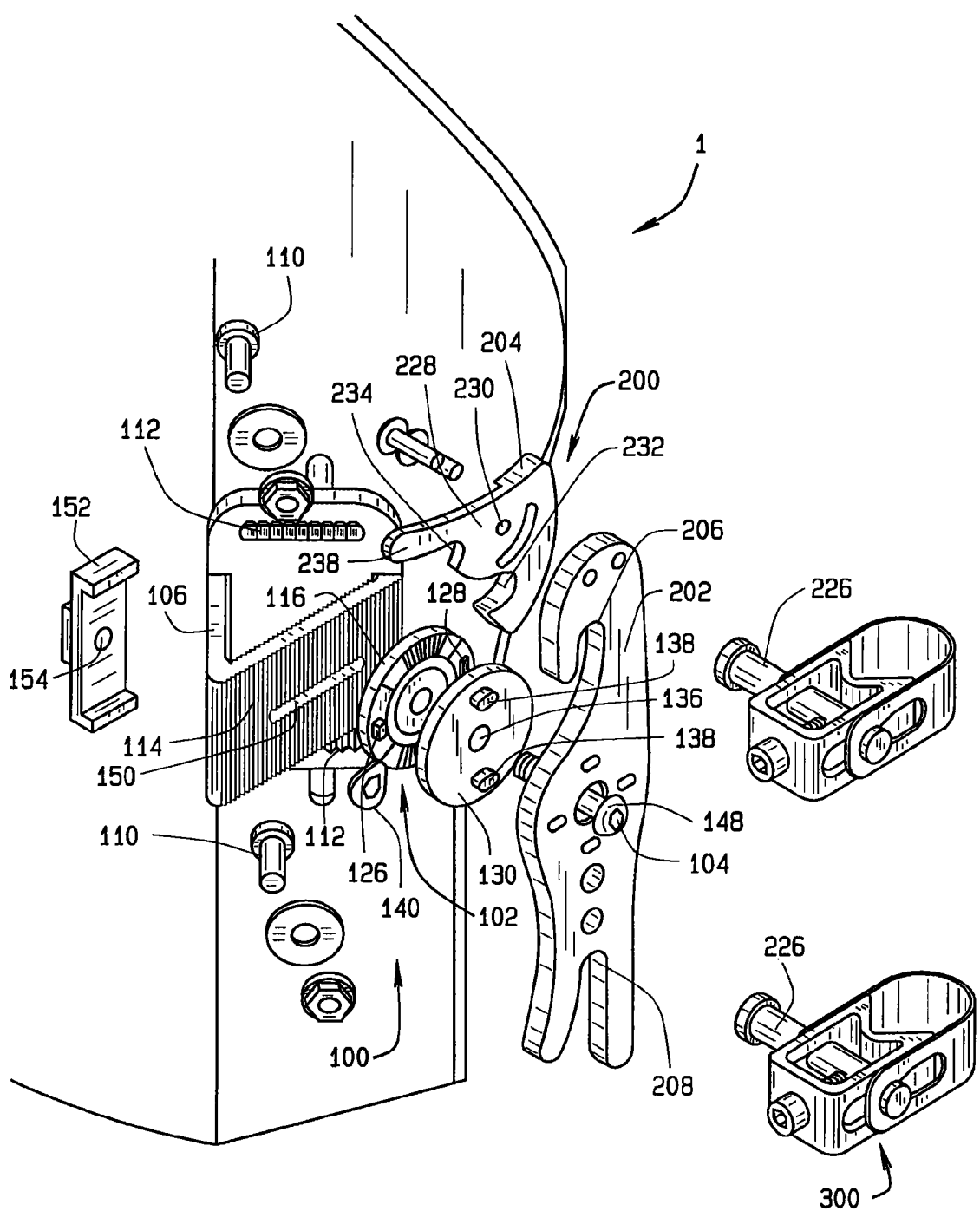
FIG. 2 is a perspective, exploded view of a wheelchair back mounting assembly and an another illustrative embodiment of the mounting clamp assembly.

The components of the mounting assembly 1 are shown in greater detail in FIGS. 1 and 2. Other of the figures also illustrate these same or similar components in more detail. It will be noted that the components of the mounting assembly 1 are constructed of a durable, light weight material, such as aluminum or the like. This material is illustrative only and the choice of materials does not affect the scope of the invention. The components and function of the adjustment apparatus 100, support mechanism 200, and mounting clamp 300 will be described in greater detail hereinafter.

The adjustment apparatus 100 allows for varying the position of the wheel chair back relative to the wheel chair seat and posts P. The adjustment apparatus includes a bracket assembly 102 which mounts to the wheel chair back B. The adjustment assembly 100 is operated by means of a single adjustment point 104 that can be manipulated with or without the use of a tool. In fact, the single adjustment point 104 can allow for adjustment of the angular position (or tilt) of the wheelchair back and the horizontal position of the wheelchair back B relative to the wheel chair posts P. In an alternative embodiment described below, the single adjustment point 104 also allows for the adjustment of the height or vertical position of the adjustment apparatus 100, and hence of the wheel chair back B.

The bracket assembly 102 includes a bracket 106 that can be attached directly to the surface of the wheelchair back B, as seen in FIGS. 1 and 2, or can be attached to a separate mounting mechanism 108, as seen in FIGS. 3 through 6 as described below. The bracket 106 can be mounted to the wheelchair back B with a fastener 110, such as a screw or bolt that is inserted through upper and lower slots 112 in a rear wall 113 of the bracket 106. The slots 112 are shown to be generally horizontal, and allow for lateral movement and positioning of the bracket 106 on the back B. By extending the length of the bracket rear wall 113, vertical slots could also be provided to allow for selective vertical positioning of the bracket 106 on the wheel chair back B. Additionally, the wheelchair back B, itself, can be provided with vertical and/or horizontal slots to allow for the selective horizontal and/or vertical position of the bracket 106 on the wheel chair back B. The bracket 106 includes a front wall 115 having a textured front surface. For example, the front surface of the wall 115 can be provided with a plurality of vertical grooves 114. The bracket front wall 115 is connected directly to the rear wall 113 at a forward end of the wall 115, and is spaced from the rear wall 113 by an end wall 111, giving the bracket 106 a generally triangular appearance when viewed from above or below.

Figure 8:
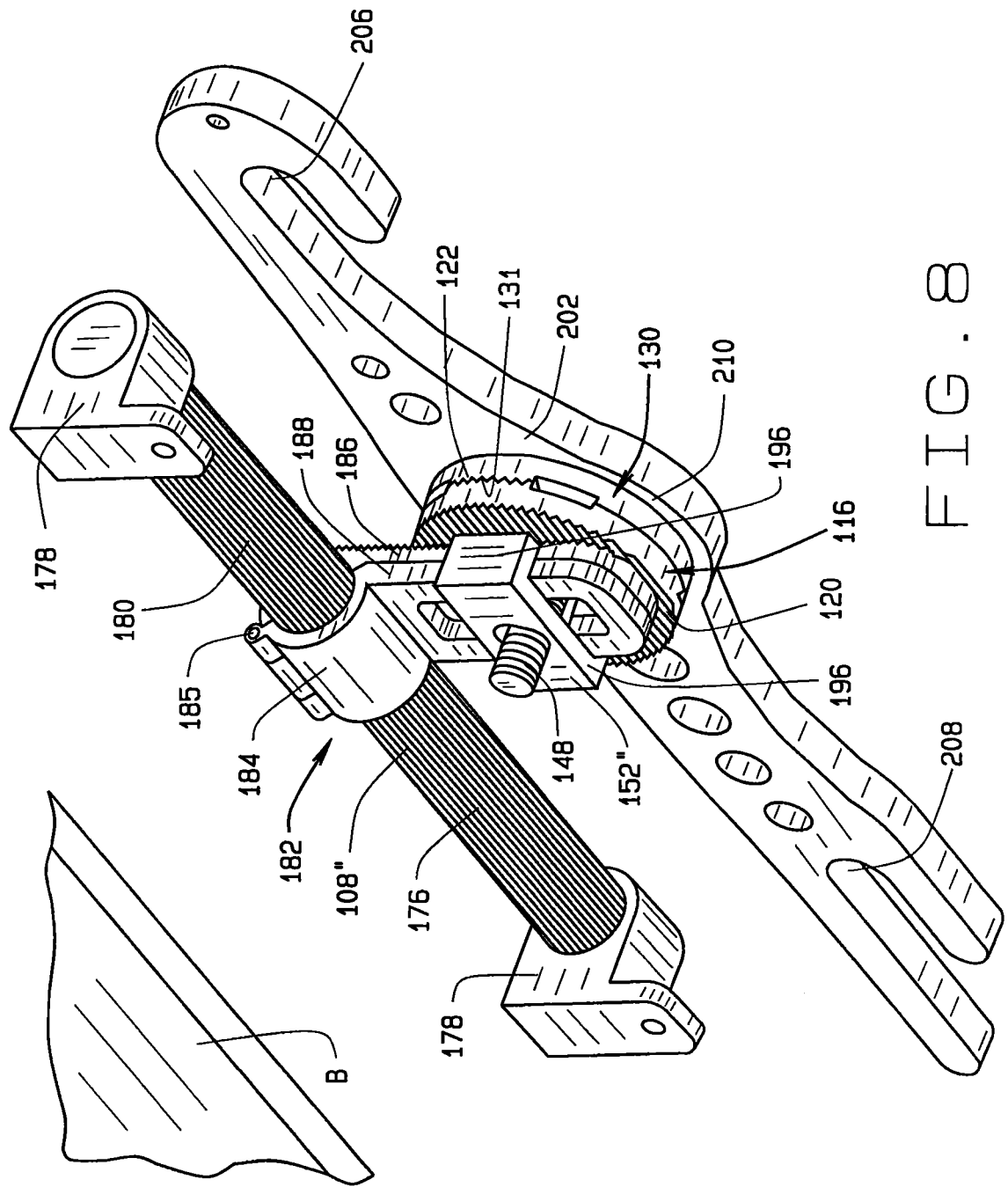
FIG. 8 is a rear perspective view of the mounting assembly of FIG. 7, again without the latch of the support assembly.

The bracket assembly 102 further includes an inner disk 116 adjacent the bracket front wall 115, and which is in an abutting relation to the front wall of the bracket 106 when the adjustment apparatus 100 is in an assembled position and tightened position (FIG. 25). The disk 116 has a central hole 118 and a textured inner surface. For example, the disk inner surface can be provided with plurality of parallel grooves 120 (FIG. 8). The texturing of the disk inner surface is complementary to the texturing of the bracket wall 115, such that the disk inner surface and the outer surface of the bracket wall 115 will abut and engage each other when the adjustment assembly is in a tightened position to prevent the disk 116 from rotating relative to the bracket 106. The outer surface of disk 116 includes opposed radial grooved 122 and 124 (FIG. 1), respectively. As best seen in FIG. 1, the grooves 122, 124 are formed in recessed, arcuate areas of the disk outer surface. The disk 116 also includes a lug 126 (FIG. 2) protruding from the outer surface and an arcuate slot 128 in the outer surface spaced approximately 180° from the lug 126.

A second, outer disk 130 is adjacent the inner disk 116. The inner surface of the disk 130 includes top and bottom radial grooves 131 (FIG. 8). a lug (not shown) protruding from the inner surface and an arcuate slot (not shown) spaced approximately 180° from the lug, a central hole 136 and top and bottom lugs 138. The radial grooves 131 of the disk 130 are shaped complementary to the grooves 112, 124 of the inner disk 116, and are positioned to engage the grooved areas 122 and 124, respectively, of the disk 116 when the adjustment apparatus 100 is in the assembled and tightened position. Likewise, the slot and lug of the disk 130 are positioned to engage the lug 126 and the slot 128 of the disk 116 when the adjustment apparatus 100 is in the assembled position. The lugs of the disks 116, 130 are smaller than the slots of the disks 116, 130 and can slide within the slots when the disks are rotated with respect to each other. The engagement of the slots and lugs of the disk 116 and 130 limit the range of rotation of disk 130 relative to disk 116 when their respective grooves are not engaged. It can be appreciated that the slots of the disks 116, 130 are shaped similarly to each other. Although the disks are each described to include both a lug and a slot, the disks 116, 130 could be formed with the lugs on one disk and the slots on the other. Further, one of the disks can be provided with a single lug, and the other of the disks could be provided with a single slot. That is, the two disks 116, 130 could be provided with a single lug and a single slot between the two to limit rotation of the disks relative to each other.

The grooves of the disk 130, when engaged with the grooves 122, 124 of the disk 116, prevent the disk 130 from rotating relative to the disk 116. Although the disks are each described to include grooved areas, the disks 116, 130 could be formed with a textured surface so as to prevent rotation when the disks are engaged. Such other texturing could, for example, include knurling of the surfaces, or providing discrete bumps, which mesh to prevent rotation of the disks relative to each other. The adjustment apparatus 100 can be provided with a biasing element 140, such as a spring washer (FIG. 1), positioned between the two disks 116 and 130. When the apparatus 100 is in an assembled but loosened position, the biasing element 140 pushes the disks 116, 130 apart disengaging the textured facing surfaces of the disks to allow for rotation of the disks 116 and 130 relative to one another.

The support mechanism 200 includes a hanger arm 202 and a latching mechanism 204. The hanger arm provides at least one support point. The hanger arm 202 has a hook 206 at a top end, a fork 208 at a bottom end, and a rounded midsection 210. The midsection 210 has a central hole 142. The central hole 142 could also be an elongated slot extending vertical or horizontally. The midsection 210 includes slots 144 in a cruciform arrangement around the center hole 142. The slots 144 of the hanger arm are substantially equal in size as the lugs 138 of the outer disk 130, and receive the lugs 138. As can be appreciated, the placement of the outer disk lugs 138 and the hanger arm slots 144 can be reversed, such that the lugs on be on the hanger arm and the slots are on the disk. It will also be appreciated that alignment of the disk 130 and the support mechanism 200 can also occur using grooves or other geometric shapes that fit within one another. The hanger arm slots 144 receive the lugs 138 of the disk 130 so that the disk 130 and the hanger arm 202 are positionally fixed relative to each other.

The hanger arm could be formed to include the second disk 130, such that the hanger arm and second disk 130 form a one-piece element of the mounting mechanism. In this variation, the disk 130 would, essentially, be a platform extending from the inner surface of the hanger arm. In a further alternative, the inner surface of the hanger arm midsection 210 can be provided with the grooves, slot, and lug of the inner surface of disk 130, thereby allowing for elimination of the disk 130. The hanger arm 202 also may have several material cutouts, such as 212 generally employed to reduce weight and for aesthetic purposes. Also, a washer 146 may be placed on the outer surface of the support mechanism 200 with the washer 146 having a central hole.

A fastener, such as a threaded screw or bolt 148, extends through the holes of the hanger arm 202, the disk 130, and the disk 116 and through a slot 150 in the front wall 115 of bracket 106 to engage a brace 152 positioned on the back side of the wall 115. The fastener can be tightened down, such that the elements of the mounting assembly engage each other to prevent movement of the elements relative to each other, and loosened, to allow for movement of the elements relative to each other. The slot 150 in the front wall of bracket 106 is shown to be horizontal to allow for horizontal positioning of the disk 116 relative to the bracket 106 as described below. Alternatively, the slot 150 could be vertically oriented to enable vertical positioning of the disk 116 relative to the bracket 106. In another alternative, the bracket 106 could include intersecting horizontal and vertical slots which could allow for selective positioning of the disk 116 both horizontally and vertically relative to the bracket 106.

The brace 152 has a centrally positioned threaded hole 154 which threadedly receives the bolt 148. When the bolt 148 is inserted through the components of the adjustment apparatus 100 to engage brace 152 and is tightened, the adjustment apparatus is in the assembled and tightened position. In this assembled and tightened position, the wheelchair back B is positionally fixed relative to the wheelchair posts P.

Referring to FIGS. 1 and 2, bolt 148 can be loosened from brace 152 and the hanger arm 202 and disks 116, 130 can be moved generally horizontally relative to the bracket 106 along a path defined by the slot 150. Hence, the wheelchair back B and the hanger arm 202 can be moved generally horizontally relative to each other. Importantly, the bolt 148 does not need to be removed to make this adjustment, only loosened sufficiently to disengage the facing textured surfaces of the bracket wall 115 and the inner disk 116. As noted above, if the bracket 106 had vertical slots as well as, or in lieu of, the horizontal slot 150, the wheelchair back mounting assembly 1 could be moved vertically to adjust the height of the back B without removing the bolt 148. These same adjustments would be possible if the slot was placed in the hanger arm 202 in addition to, or in lieu of, the slot 150 of the bracket 106.

Further, the angular position or tilt of the back B can be adjusted by loosening the bolt 148. Once the bolt is loosened from the brace 152, the facing textured surfaces of the disks 116, 130 can be disengaged by separating the disks. The biasing element 140 urges disks 116 add 130 apart enough to allow the texturing (e.g., grooves) on each disk to disengage each other. With the grooves disengaged, the disk 130 and the support mechanism 200 can rotate relative to the disk 116 and the bracket 106 (or vice versa) to adjust the tilt of the wheelchair back B. Once the tilt is satisfactory, the bolt 148 is tightened to secure the back B in its new position. Consequently, the bolt 148 can allow for adjustment of the wheelchair back horizontally, and angularly. In an embodiment described below, the adjustment mechanism also allows for vertical adjustment, thereby providing three degrees of freedom for the wheelchair back B.

As described above, the lug 126 of the disk 116 engages an arcuate slot in the inner surface of the disk 130. Similarly, the lug on the inner surface of the disk 130 engages the arcuate slot 128 in the disk 116. The arcuate shape of the respective slots allows the disks to rotate with respect to each other. However, since the arcuate slots are of a defined length, there is a limitation to the rotational movement of the disks relative to each other and hence the tilting of the wheelchair back is limited. The tilt permitted by the disks is sufficient to accommodate a broad range of seating preferences. If the adjustment apparatus 100 would loosen, for example if bolt 148 was not sufficiently tightened or became loose, the wheelchair back B could inadvertently tilt. However, due to the finite length of the arcuate slots, the angular motion of the wheelchair back B is limited.

The embodiment of the mounting assembly illustrated in FIGS. 3 and 4 includes further apparatus for permitting easy vertical adjustment of the wheelchair back. As previously stated, bracket 106 can be attached to the mounting mechanism 108 that is, in turn, connected to the wheelchair back B. In this embodiment, the bracket 106' includes a recess 156 in the rear wall of the bracket. The recess 156 is bordered by opposed inwardly facing vertical flanges 158. As shown, the mounting mechanism 108 is substantially flat and includes two spaced apart generally L-shaped vertical tracks 160. The flanges 158 are slidingly engaged by the tracks 160 so the bracket 106 can move vertically along the track. The bracket 106 is secured in place with a fastener 162 that is inserted through slots (not shown) in the bracket 106 and secured to the mounting mechanism 108. If the fastener 162 is a set screw, the set screw will allow for infinite vertical adjustability along the tracks 160. The mounting mechanism 108 can be mounted to the wheelchair back B with a fastener in the same manner as the bracket 106.

Likewise, the mounting mechanism 108 includes horizontal slots 164 allowing lateral movement and positioning of the mounting mechanism 108 on the back B. As seen, the tracks 160 define outwardly opening channels which receive the inwardly directed flanges 158 of the bracket 106'. However, the mounting mechanism 108 could be provided with inwardly directed channels, and the bracket 106' could be provided with outwardly extending flanges. Alternatively, the channels could be formed in the bracket 106' and the flanges could be formed in the mounting mechanism 108.

Figure 5:
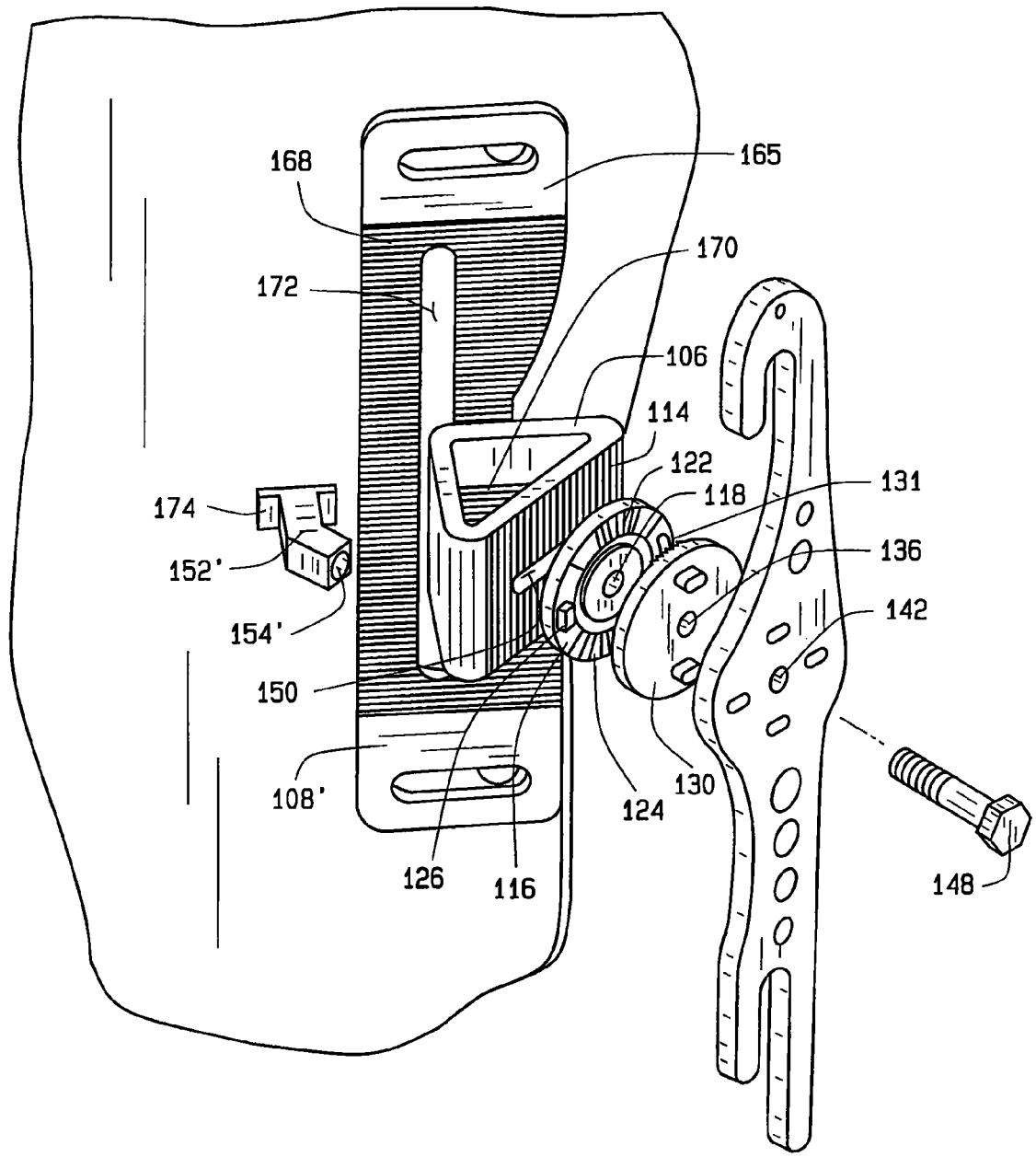
FIG. 5 is an exploded perspective view of a wheelchair back mounting similar to that of FIG. 3 but employing an alternative plate, the drawing omitting a latch of the support assembly for purposes of clarity.
Figure 6:
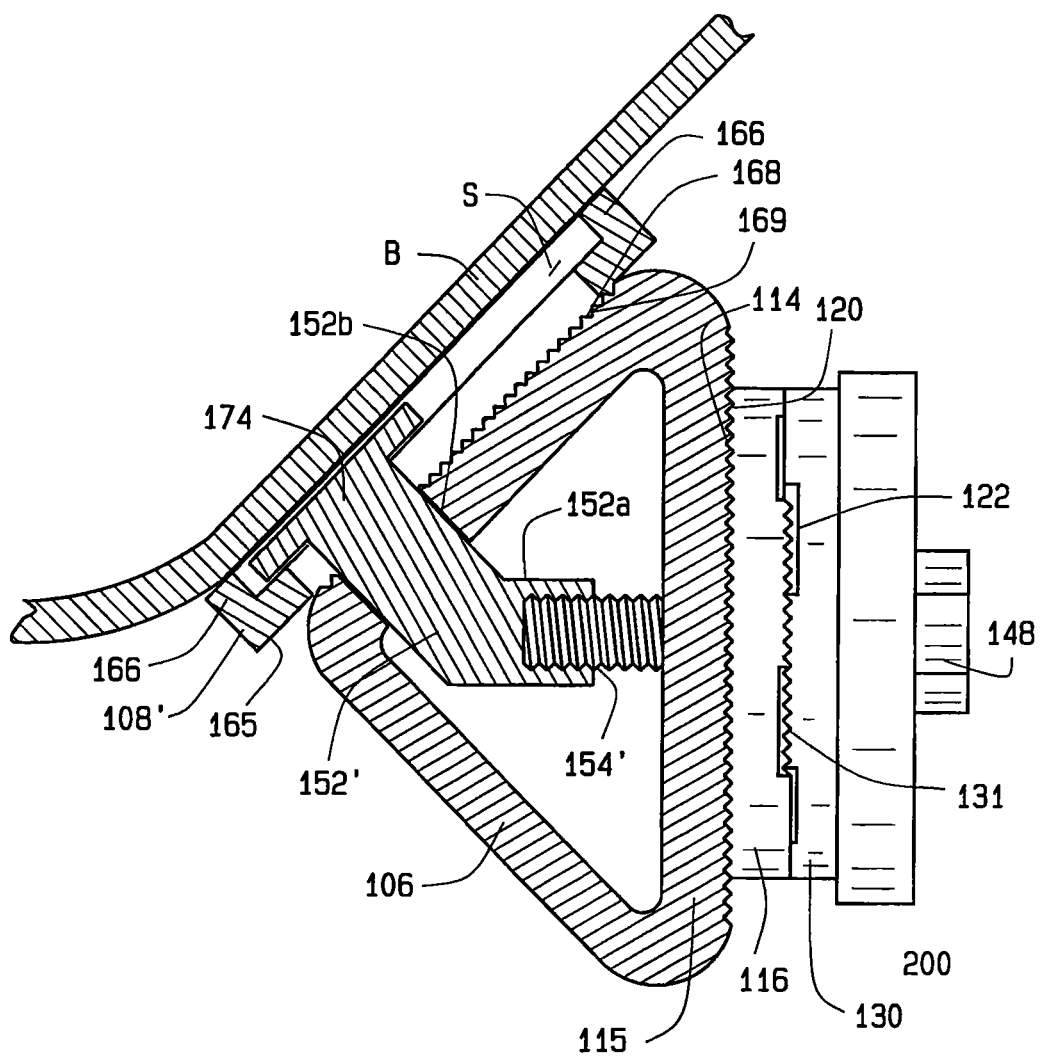
FIG. 6 is a top plan view partly in cross-section of the mounting assembly of FIG. 5 in an assembled and tightened state.

FIGS. 5 and 6 illustrate another variation of the adjustment apparatus 100. As shown, the adjustment apparatus 100 includes many of the same components previously described. The mounting mechanism 108' is adjustably secured to the wheelchair back B similarly to that of the mounting mechanism 108 in FIGS. 3 and 4. In this embodiment, mounting mechanism 108' includes a substantially flat plate 165 and a pair of spaced apart vertical runners 166 that abut the wheelchair back B creating a space S between the wheelchair back B and the mounting mechanism plate 165. The mounting mechanism 108' can include texturing 168 (such as horizontally orientated grooves) on the front surface of the plate 165. Similarly, the rear wall of the bracket 106 can include texturing 169 (such as horizontally orientated grooves as seen in FIG. 6) to engage the mounting plate grooves 168 when the bracket 106 and the mounting mechanism 108' are in an abutting relationship. The rear wall of the bracket 106 includes an opening 170. The mounting mechanism 108' has an elongated, vertical slot 172 in the plate 165. As best seen in FIG. 6, the brace 152' has a forward portion 152a, a rear portion 152b, and flange 174 at the back of the brace rear portion. A threaded opening 154' is formed at the forward end of the brace forward portion 152a. The brace portions 152a,b define an angle such that the brace rear portion 152b is substantially perpendicular to the mounting mechanism plate 165 and such that that brace forward end 152b is substantially perpendicular to the forward wall 115 of the bracket 115 such that the hole 154' is aligned with the bolt 148 and the flange 174 is parallel to the wheelchair back B. The flange 174 is wider than the slot 172 in the mounting mechanism plate 165.

It will be appreciated that the brace 152' extends through the vertical slot 172 of the mounting mechanism 108 with the flange 174 positioned in the space S between the runners 166 behind the mounting mechanism plate 165. In use, the bolt 148 extends through the other components as previously described and threadedly engages hole the 154' in the end of the brace 152'. When the bolt is loosened, the brace can be moved up and down within the slot 172 to achieve a desired height adjustment of the wheelchair back. Moreover, the other components are loosened as well so that tilt and/or horizontal adjustment of the wheelchair back can be made, as previously described. Consequently, one adjustment point, e.g. the bolt 148, allows for adjustment of the wheelchair back's angular, vertical, and horizontal orientation relative to the wheelchair posts P.

Figure 7:
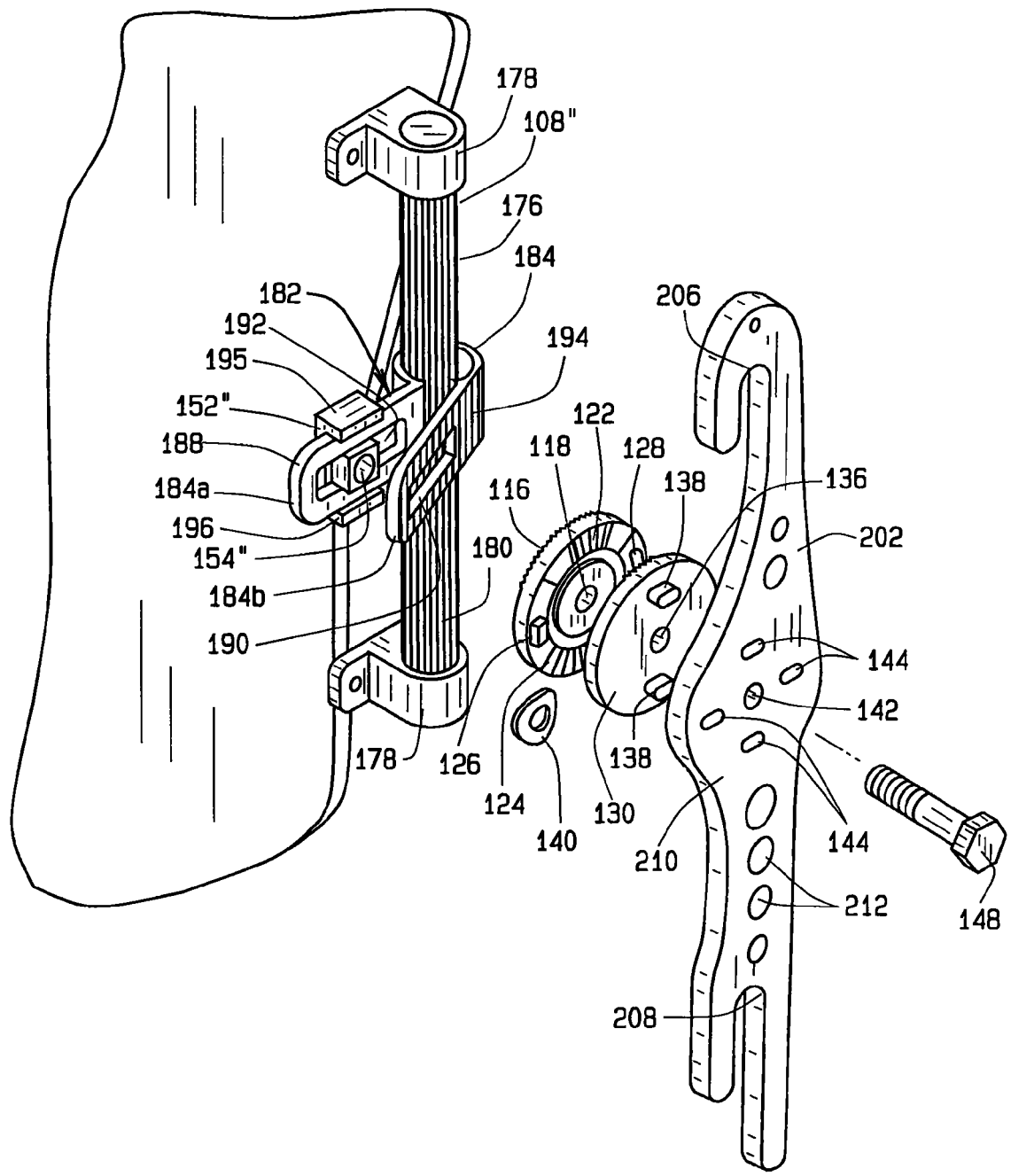
FIG. 7 is an exploded perspective view of the wheelchair back mounting assembly employing another illustrative embodiment of the adjustment apparatus and wherein the latch the support assembly has been removed for purposes of clarity.
Figure 9:
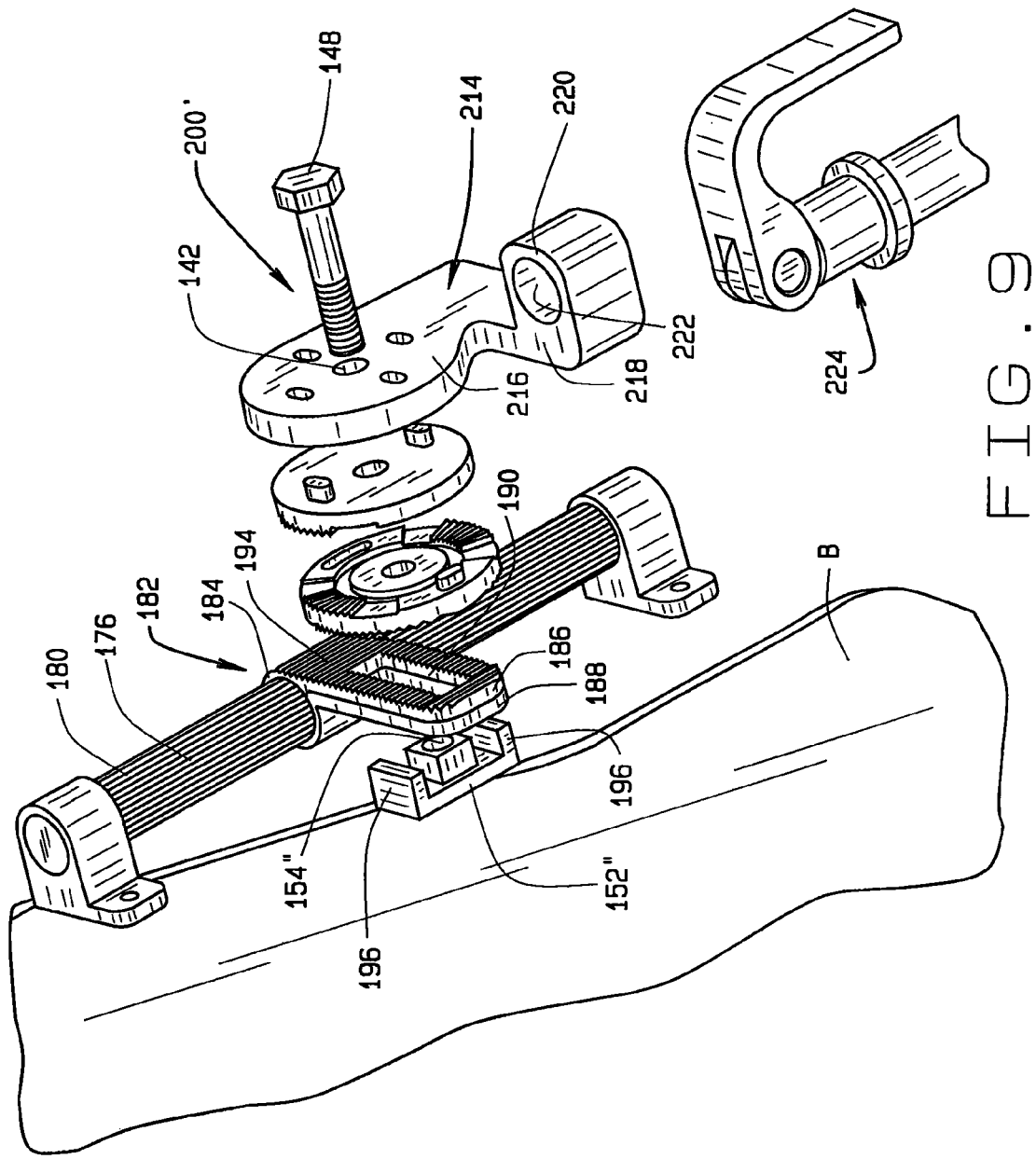
FIG. 9 is an exploded perspective view of a wheelchair back assembly employing the adjustment apparatus of FIG. 7 and another illustrative embodiment of the support assembly.

FIGS. 7 through 9 illustrate another version of the mounting assembly that permits at least a three way adjustment of the wheelchair back B using only one adjustment point. Again, most of the components are constructed and arranged as previously described. In this version, the mounting mechanism 108" includes a vertically extending bar 176 attached to the wheelchair back B with upper and lower brackets 178. While the brackets 178 are shown, any appropriate attachment mechanisms can be used to attach the bar 176 to the wheelchair back B. The bar 176 includes a texturing 180 (such as knurls or vertically extending grooves) on its surface. The bracket 106 of FIGS. 1 through 6 is replaced by a bracket 182 which is positioned around the bar 176. The bracket 182 includes first and second arms 184a,b which in combination define a circular section 184 sized to tightly fit around the bar 176 such that the circular section frictionally engages the bar 176. A hinge 185 in the circular section 184 connects the bracket arms 184a,b and allows the bracket to pivot between an open position in which the circular section 184 can be placed around the bar 176 and a closed position in which the circular section is around the bar 176. Alternatively, the bracket 182 can be a single piece, and the circular section 184 can be sufficiently flexible to allow opening of the bracket 182 without the hinge 185. The interior surface of the circular section 184 includes texturing (such as knurls or vertical grooves) complementary to the texturing of the bar 176 that engage the textured surface 180 of the bar 176 to keep the bracket 182 from moving (either vertically or rotationally) relative to the bar 176 when the bracket 182 is secured to the rod.

The bracket 182 has a first extension 186 and an opposed, second extension 188, both extending out from the circular section 184. The first and second extensions 186 and 188 include a slots 190, 192 which are aligned with each other when the circular section 184 is closed. The outer surface of the first extension 186 includes texturing 194 (such as a plurality of vertical grooves) that is complementary to and engages the texturing 120 on the inner side of the disk 116. The brace 152" includes flanges 196 extending around the bracket extensions 186, 188. The hole 154" of brace 152" is formed in a central body of the brace 152" which protrudes through the slots 190, 192 of the extensions 186 and 188, respectively. Preferably the brace central body is flush with the outer grooved surface of the first extension 186 when assembled.

When assembled, the bolt 148 threadedly engages the hole 154" in the brace 152". The bolt is tightened to secure the moveable parts of the mounting assembly to hold the wheelchair back B in position relative to the wheelchair posts P. When the bolt 148 is loosened, the bracket 182 is loosened allowing sliding movement of the bracket 182 vertically along the bar 176 for adjusting the vertical position of the wheelchair back B. Also, loosening the bolt 148 allows for adjustment of the angular position, as previously described. Finally, the brace 152" and disks 116, 130 can move horizontally along the horizontal length of the slots 190, 192 of the extensions 186, 188 when the bolt 148 is loosened allowing for horizontal adjustment of the back B. Hence, by using a single point adjustment, i.e. the bolt 148, one can adjust the vertical position, the angular position, and the horizontal position of the wheelchair back B.

Figure 23:
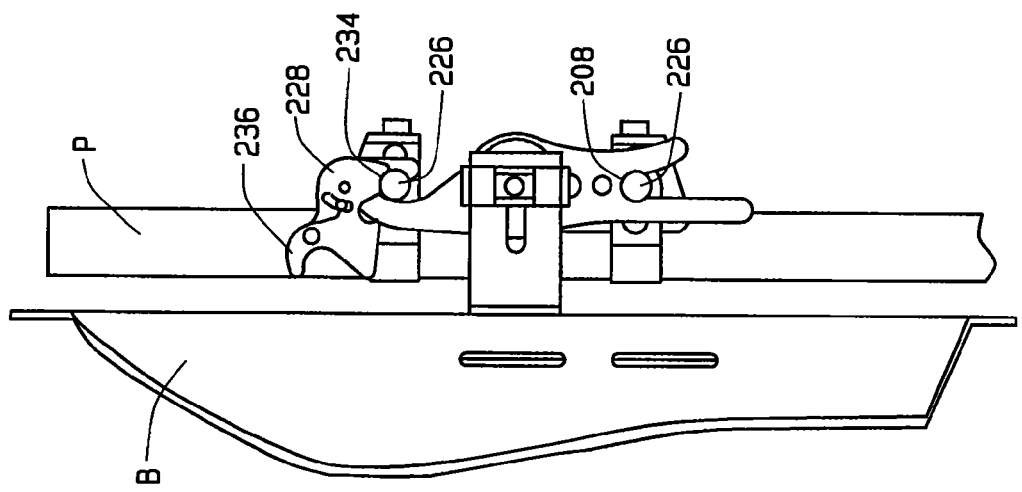
FIG. 23 is a side view of the mounting assembly with the latching mechanism rotated to an unlocked position in preparation of for removing the wheelchair back from between the wheel chair posts.
Figure 22:
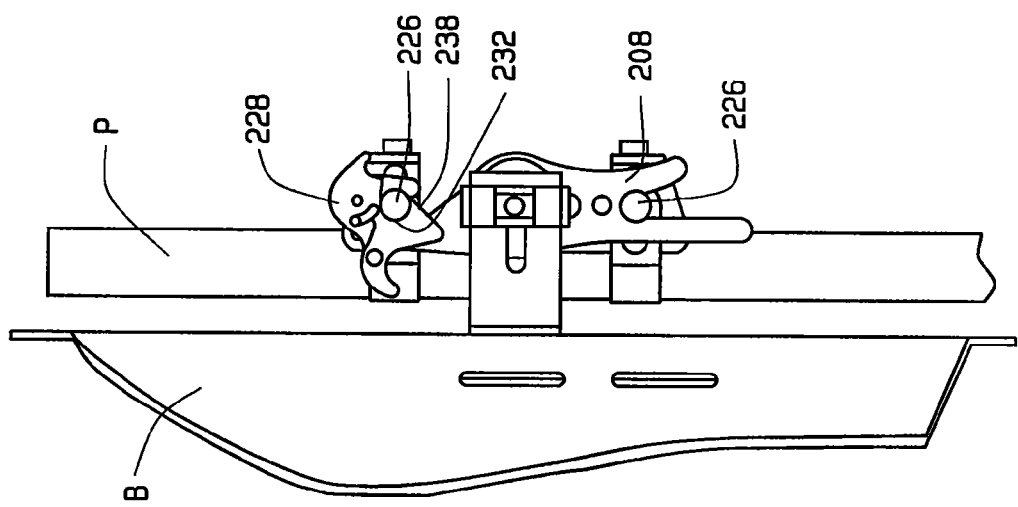
FIG. 22 is a side view of the support mechanism of the mounting assembly in a locked position.

The latching mechanism 204 of the support mechanism 200 is self-locking in that it locks to an upper support post 226 extending from the wheelchair post P under its own weight. The latching mechanism includes a latch 228 pivotally connected to the hook 206 of the hanger arm 202 at a pivot point 230. The latch 228 includes a first notch 232 that engages the upper support post 226 along with the hanger arm hook 206 when the latching mechanism is in a locked position (FIG. 22). In the locked position, the notch 232 and hook 206 define a circle which surrounds and encloses the support post 226 to securely attach the wheelchair back B to the upper support post 226. The latch 228 may include a second notch 234 that engages the upper support post 226 along with the hanger arm hook 206 when the latching mechanism is in an unlocked position (FIG. 23). In this position, the support mechanism 200 is securely attached to the upper support post 226 even though the latching mechanism 200 is in the unlocked position and the support post 226 is not enclosed by the notch 234 and the hook 206.

As can be appreciated, the support mechanism 200 and the wheelchair back B are securely attached to the post 226 even though the latch is not fastened or locked to the post 226. This is because the hook defines a downwardly opening passage that has a length greater that the width of the support post 226. Thus, even though the latch 228 is in an unlocked position, the engagement of the hanger arm hook 206 with the support post 226 will prevent the mounting mechanism from disengaging the support post 226. When the second notch 234 of the latching mechanism 204 is disengaged from the support post 226, the weight of the latching mechanism 204 orients the latch 228 back to the locked position.

Figure 18:
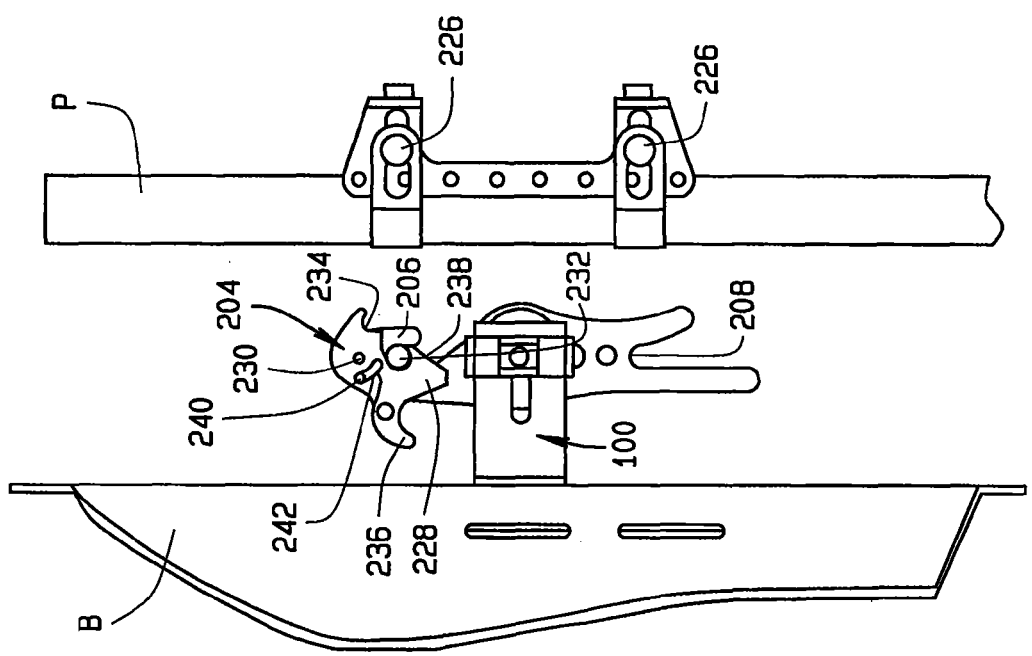
FIG. 18 is a side view showing a mounting assembly fixed to a wheelchair back and a mounting clamp fixed to a wheel chair post, with the wheel chair back being spaced from the wheel chair post in preparation for mounting the wheel chair back to the wheel chair post.

Also, the latching mechanism 204 can be moved from the locked position to the unlocked position with the use of a handle 236 connected to the latch 228 such that a tool is not needed. The latching mechanism 204 is moved from the locked position to the unlocked position by lifting up on the handle 236 (FIGS. 18 through 24). In another embodiment, the latching mechanism 204 is moved to the unlocked position by pushing down on the handle 236 (FIGS. 1 and 2). The latch 228 further includes an attachment or camming surface 238 extending forwardly from an outer edge of the first notch 232. When the support mechanism 200 is disengaged from the upper support post 226, the weight of the latching mechanism 204 orients the latch 228 such that the attachment surface 238 is exposed in the hook 206 of the support mechanism 200 such that the hook 206 and the latch notch 232 form a circle, as seen in FIG. 18.

Also, when the latching mechanism 204 is in the locked position, the attachment surface 238 is exposed in the hook 206 of the support mechanism 200. The latching mechanism may include a spring to further orient the latch 228 to the locked position. The attachment surface 238 is oriented to be angled relative to the horizontal and vertical when the latch is in the locked position. This angular positioning of the attachment surface 238 causes the latch 228 to pivot from the locked position when the attachment surface engages the support post P to effectively open the hanger arm hook 206 to allow the hanger arm hook 206 to engage the support post P.

The hook 206 may include a lug 240 (FIG. 18) that is aligned with an arcuate slot 242 in the latch 228. The lug 240 and the slot 242 limit the range of pivoting of the latch 228 with respect to the hook 206. The specific range of pivoting allows the latch 228 to move between the locked position and the unlocked position. The latch 228 is in the locked position when the latching mechanism 204 is disengaged from the upper support post 226 (as in FIG. 18) and when the latching mechanism is engaged with the upper support post 226 via the latch notch 232 and locked to the post (as in FIG. 22). The latch 228 is in the unlocked position when the latching mechanism 204 is engaged with the upper support post 226 by way of the latch notch 234 (as in FIG. 23). It will be understood that a second mirror image support mechanism 200 would be attached to the opposite side of the wheelchair back B.

The mounting clamp assembly 300 mounts the support posts 226 to the wheelchair post P. The mounting clamp assembly 300 includes a band assembly 302 that allows the clamp assembly 300 to be connected to the wheelchair post P to provide at least one point of support for the hanger arm 202 (and hence for the wheelchair back B). The band assembly 302 connects to the wheelchair post P such that the band assembly 302 can attach to a plurality of different post P diameters, as shown in FIGS. 11A through 11C.

Figure 12:
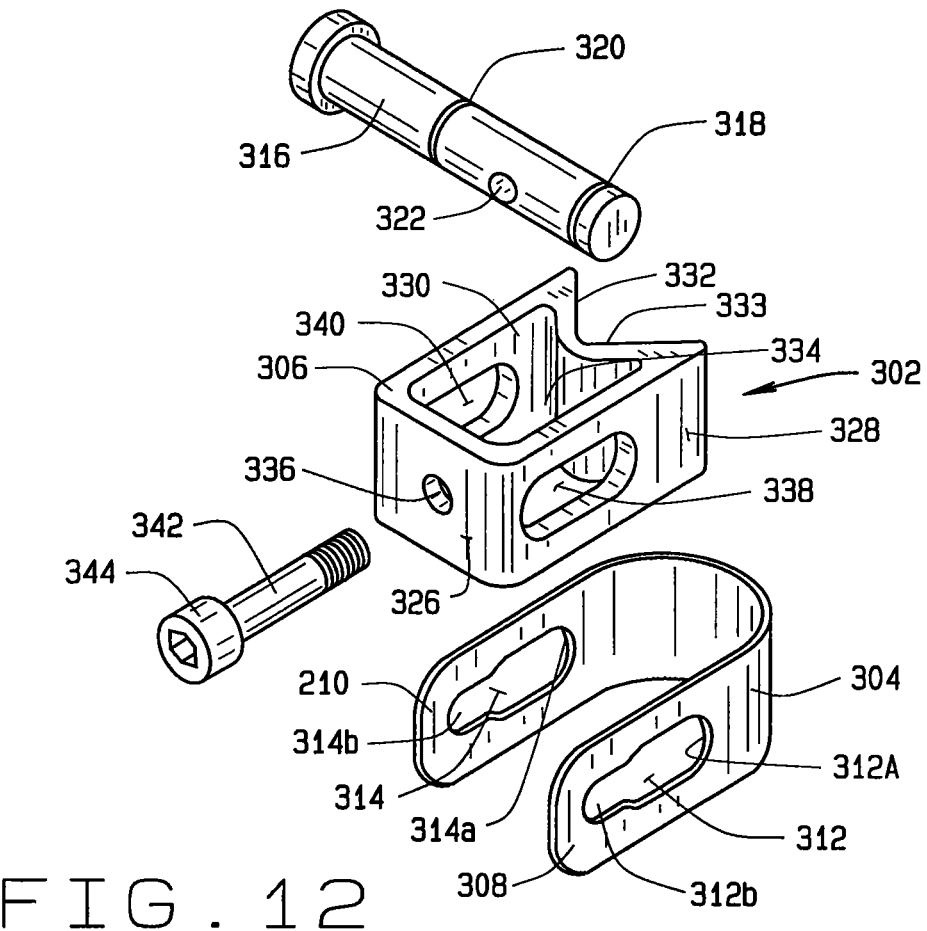
FIG. 12 is a perspective view of the mounting clamp of FIG. 10 in a disassembled state.

FIGS. 10 through 12 illustrate an illustrative embodiment of the clamp assembly 300. The clamp assembly 300 includes a band 304 for engagement of the wheelchair frame post P and a block 306. The band 304 is substantially C-shaped having a first arm 308 and a second, opposed arm 310. The band 304 generally is made from a flexible metal but may be made of any suitable material for supporting the weight of the wheelchair back mounting assembly 1. There is a first opening 312 in the first arm 308 and an opposed, mirror image opening 314 in the second arm 310. As best seen in FIG. 12, each opening 312, 314 is an elongate opening having a forward portion 312*a*, 314*a* and a rear portion 312*b*, 314*b*. The rear portions 312*b*, 314*b* are narrower than the wide portions 312*a*, 314*a*.

The block 306 has a generally rectangular configuration, with a rear wall 326, a first side wall 328, a second side wall 330, and a forward wall 332. The block may be constructed from a lightweight but durable material such as cast, machined or extruded aluminum. The block 306 could also be formed from an appropriate plastic or any other material which will structurally support the wheelchair back B. The block 306 can be solid or could be provided with a central opening 334 of any appropriate configuration. The forward wall 332 has an indentation 333 for engagement of the frame post P when installed on a wheelchair frame, as shown generally in FIGS. 11A-C and 14. The indentation 333 is generally v-shaped to allow the forward wall 332 to engage wheelchair posts P of different diameters. A bore 336 is formed in the rear wall 326 and can be threaded or smooth. An elongated slot 338 is formed in the first side wall 328, and a mirror image elongated slot 340 in the second side wall 330. The block 306 is positioned between the arms 308, 310 of the band 304 with the slots 338, 340 of the block 306 in alignment with openings 312, 314 of the band 304, respectively.

A cylindrical pin 316 that is longer than the block 306 is wide extends through the aligned openings 338, 340 of the block and slots 312, 314 of the band. The cylindrical pin 316 can be constructed from machined steel or the like. The pin 16 has circumferential grooves 318, 320 spaced apart a distance slightly greater than the width of the block 306 and a bore 322 generally midway between the grooves 318, 320. The groove 318 being proximate an end of the pin 316. The pin 316 is a diameter sized to enable the pin 316 to pass through the wider portion 312a, 314a of the band slots 312, 314. The grooves 318, 320 are sized to receive the narrow portions 312b, 314b of the band openings 312, 314, and hence, the width of the band slot portions 312b, 314b is slightly smaller than the diameter of the pin 316, but is greater than the inner diameter of the grooves 318, 320.

It will be noted that the grooves 318, 320 and bore 322 are not centrally positioned on the pin in this embodiment but are offset toward one end of the pin. This results in a portion of the pin extending out of the band 304 to define the support post 226 for the support mechanism 200, as previously described. A threaded screw or bolt 342 extends through the bore 336 in the rear wall of the block 306 and threadedly engages the bore 322 of the pin. At least one of the pin bore 322 and the bore 336 in the block wall 326 is threaded, such that rotation of the bolt 342 moves the pin 316 toward and away from the block wall 326 (depending on the direction of rotation of the bolt 342). If the pin bore 322 is not threaded, the pin 316 will need to be fixed to the bolt in a manner such that the axial position of the pin relative to the bolt will remain fixed.

Figure 15:
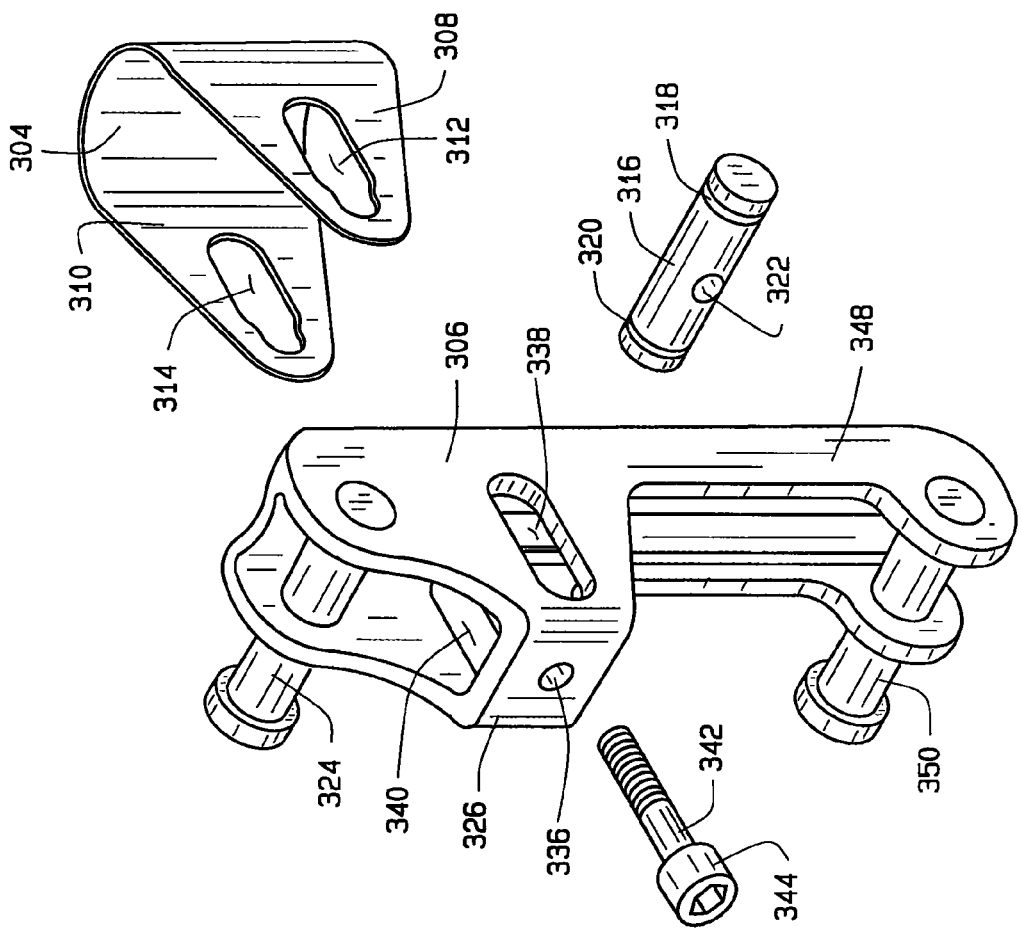
FIG. 15 is a perspective view of the mounting clamp of FIG. 14 in a partially disassembled state.

It will be understood from the drawings, and particularly FIGS. 12 and 15, that the clamp 300 is simple to disassemble without tools by removing the bolt 342. In use, the band 304 is positioned relative to the block 306, and the pin 316 is introduced through the aligned openings in the band 304 and in the block 306 and moved back until the grooves in the pin 316 contact the openings 312, 314 in the band arms 308, 310. The bolt 342 is introduced through the hole 336 and threadedly engaged by the bore 322. The band 306 is positioned on the block via operation of the bolt 342 to provide a space between the band 306 and the forward wall 332 of the block sufficient to fit over the wheelchair post P. As the bolt 342 is tightened, the pin 316 is drawn toward the block wall 326, pulling or drawing the band 316 toward the forward wall 332 of the block 306 to clamp the post P between the band 304 and the block forward wall 332, thereby tightly securing the clamp 300 in place on the wheelchair post P. It will be noted that the bolt 342 has a substantial head section 344 that can be easily manipulated by hand or by using an Allen wrench in a hole. FIGS. 11A through 11C illustrate how the clamp 300 allows for secure attachment to posts P1 through P3 of various diameters.

Figure 13:
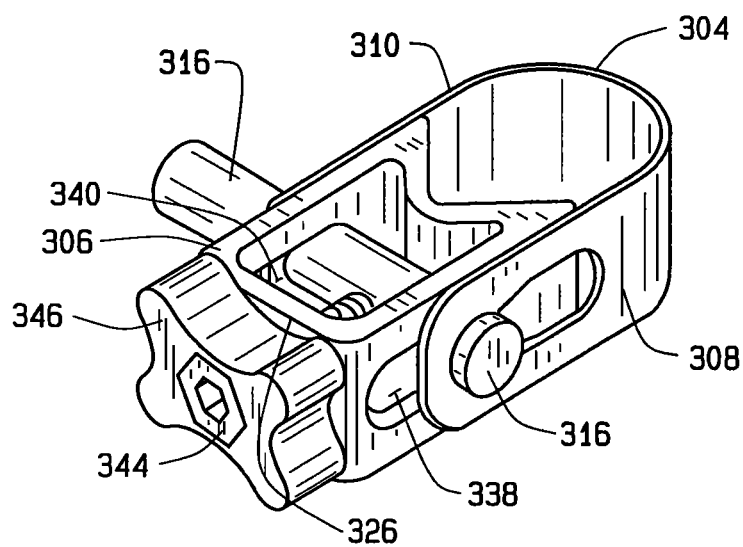
FIG. 13 is a perspective view of the clamp of FIG. 12 provided with a grip or knob to facilitate operation of the clamp without the use of tools.

FIG. 13 illustrates a variation of the mounting clamp 300, including the major components described above. In this embodiment, the bolt 342 has a hex head 344. The mounting clamp 300 includes a handle 346, in the form of a grip or knob having an opening shaped complementary to the head 344 such that the handle 346 fits around the hex head 344 in order to facilitate hand manipulation of the bolt 342. The overall configuration and dimensions of the handle 346 are such that it has optimal ergonomic characteristics.

Figure 14:
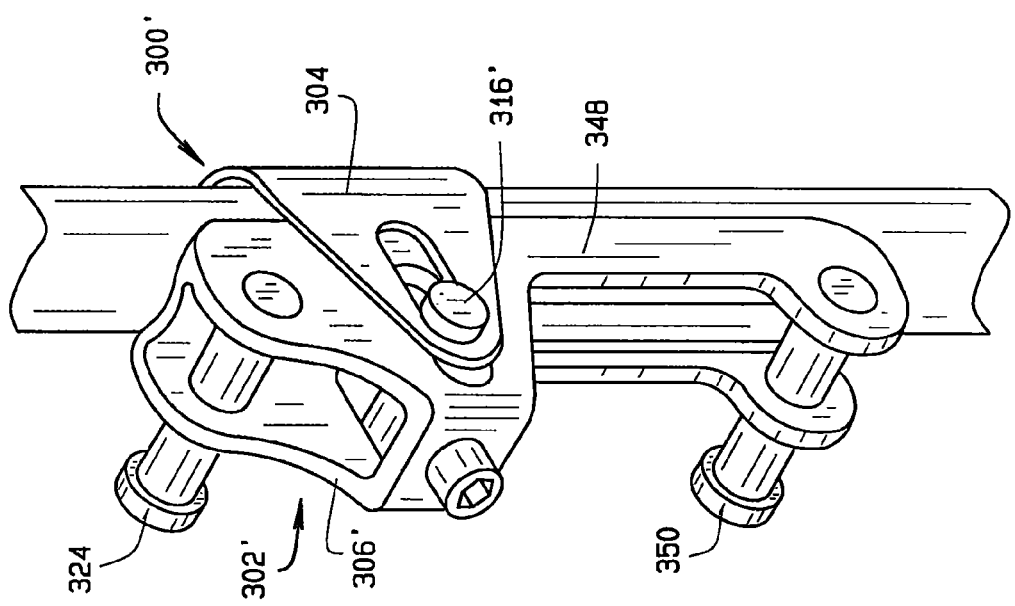
FIG. 14 is a perspective view of another illustrative embodiment of the mounting clamp incorporating two support posts.

FIGS. 14 and 15 illustrate a variation of the clamp 300'. In this embodiment, block 306' includes an extension 348 extending from the bottom of the block 306'. The extension 348 has a forward surface identical in shape to, and flush with, the forward surface of the block 306. Hence, the clamp assembly 300' has an elongated generally v-shaped forward surface to allow the clamp assembly 300' to accommodate wheelchair posts of differing diameters. A second support post 350 extends from a bottom of the extension 348. The second support post 350 forms the lower support post 226 of FIG. 1. This embodiment of the clamp 300' includes the band assembly 302' substantially as discussed above with FIGS. 10-12. However, the pin 316' does not extend substantially beyond the block side wall to define the support post 226. Rather, the clamp 300' has the separate pin 324 that forms the support post 226. The band assembly 302' functions the same way as the clamp 300 previously described relative to FIGS. 10 through 12. The length of the extension 348 may vary, but can be made a sufficient length so that the respective support posts 324, 350 are positioned to engage the hanger arm hook 206 and fork 208 as previously described.

FIG. 16 illustrates another variation of the clamp assembly. This embodiment of the clamp assembly 300" includes an elongated extension 352 that incorporates an upper clamp 300 and a lower clamp 300. The extension 352 has a forward wall that is of the same shape as, and flush with, the forward walls of the clamps 300, such that the clamp assembly 300" has a continuous forward wall. Both of the clamps of this embodiment include the band assembly 302 with all of its components previously discussed. The respective first and second clamps and associated components function the same way as those described above relative to FIGS. 10 through 12. The length of the extension 352 may vary, but can be made a sufficient length so that the respective pins 316 are positioned to engage the hanger arm hook 206 and fork 208 as previously described. As can be appreciated, the clamp 300" can be provided with a clamp block 306' such as shown in FIG. 14, such that the clamp 300" includes separate pins 316 and support posts 324.

Figure 19:
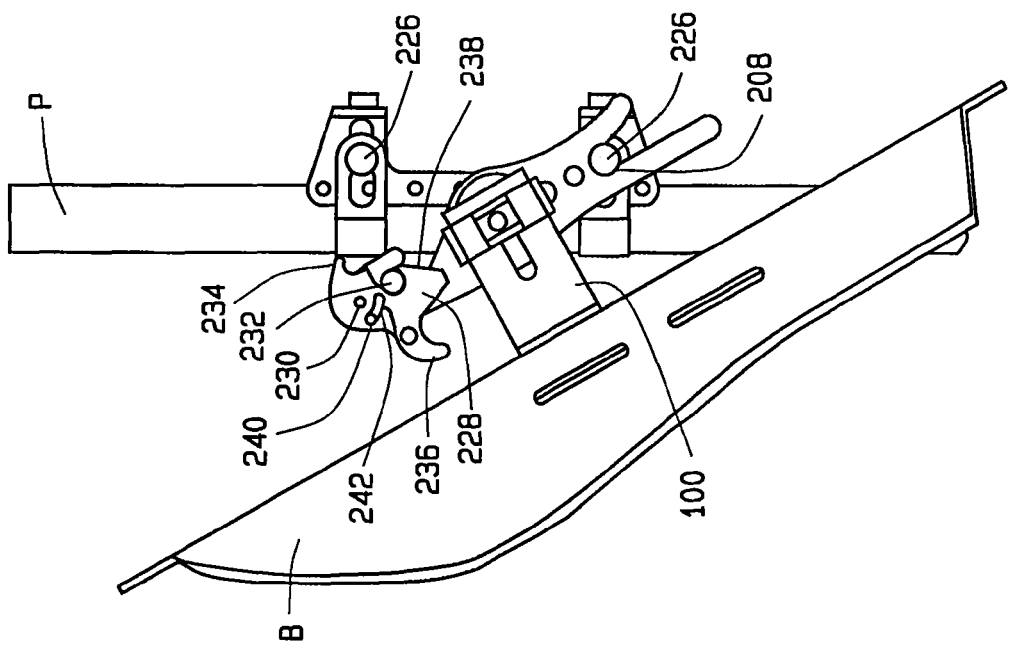
FIG. 19 is a side view of the mounting assembly in a partially engaged state with the mounting clamp support post.

In use, the a mounting assembly (with its associated adjustment apparatus and support mechanism) is mounted to each side of the wheelchair back B and a mounting clamp (with support post) is connected to each of the wheelchair posts P as seen in FIG. 26. With the mounting assembly disengaged from the upper and lower support posts 226, the latching mechanism 204 is in the locked position (FIG. 18). To engage the support mechanism 200 with the wheelchair posts P, the fork 208 of the hanger arm 202 is engaged with a lower support post 226 (FIG. 19). The support mechanism is then rotated such that the hook 206 engages the upper support post 226 with the latch attachment surface 238 exposed in the hook 206 (FIGS. 19 and 20). As seen, the hook 206 defines a downwardly opening notch and it is this notch that receives the upper support post 226. In this position, the latch attachment surface is engaged with the upper support post 226, but effectively closes the hanger arm hook. By urging the mounting assembly downwardly, the latch attachment surface 238 engages the upper support post 226 and cause the latch 228 to rotate such that the latch notch 232 will be aligned with the upper support post 226 and to effectively open the hook 206 allowing the hook to receive the support post 226 (FIG. 21). When the hook 206 is engaged on the upper support post 226, the weight of the latching mechanism 204 pivots the latch 228 back to the locked position substantially enclosing the upper post 226 within a hole or circle defined by the hook 206 and the latch first notch 232. With the latching mechanism 204 in the locked position, the mounting assembly securely engaging the upper and lower support posts 226 (FIG. 22), and cannot be inadvertently removed from the support posts 226.

With the mounting mechanism in the locked position, and the wheelchair back B mounted between the wheelchair posts P, the adjustment mechanism can be loosened to adjust the angular, horizontal, and/or vertical position of the wheelchair back B relative to the wheelchair posts P.

Figure 24:
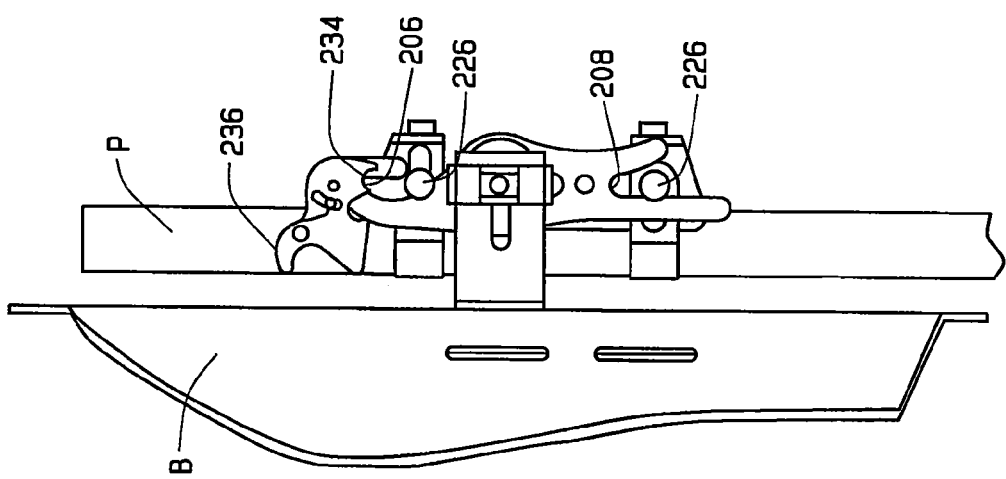
FIG. 24 is a side view of the support mechanism being moved slightly vertically relative to the support posts as the wheel chair back is removed from between the wheel chair posts.

To remove the wheelchair back B from the wheelchair, the latching mechanism is first moved to the unlocked position using the handle 236. The latch 228 of each of the mounting assemblies (i.e., the left and right mounting assembly) is pivoted until its second notch 234 engages the upper support post 226 (FIG. 23). Due to the size of the hanger arm hook, the upper post 226 is still securely engaged by the hanger arm hook 206, but the latch 228 is not locked to the upper post 226. Further, the lower post 226 is still engaged by the hanger arm fork 208. Hence, although the latch is in an unlocked position, the support mechanism 200 is still engaged with the support posts and cannot be inadvertently removed from the support posts 226. With the latching mechanism 204 in the unlocked position, the wheelchair back B, with its associated mounting assemblies, can be lifted upwards to disengage the support mechanism 200 from the upper and lower posts 226 (FIG. 24). When the support mechanism is disengaged from the upper post 226, the latching mechanism 204 returns to the locked position under the weight of the latching mechanism 204 (FIG. 18).

The support mechanism 200 allows for disengagement from the support posts 226 using one hand. The two support mechanisms 200, one on the right and one on the left, can be disengaged separately with one-handed operation using the handle 236 of the latch of each support mechanism, in a two-step process. The third step of lifting the back can also be completed with one hand once the right post and left support mechanisms 200 are in the unlocked position. FIG. 9 illustrates an alternate support mechanism 200'. Instead of having a hanger arm 202, it includes a frame connector 214. The frame connector 214 includes a body 216 having a substantially circular configuration that performs a function similar to that of midsection 210 of hanger arm 202 previously described. The frame connector 214 includes an extension 218 having a terminal boss 220 with a hole 222 therein. A lever actuated quick release device 224 is inserted through bore 222. The quick release device 224 is constructed and functions similarly to the quick release device described in U.S. Pat. No. 6,095,611, which is incorporated herein by reference.

FIG. 17 illustrates an embodiment of the mounting clamp assembly 300" that can be used with the support assembly of FIG. 9. In this embodiment, the mounting clamp assembly 300' includes a horizontal extension 354 extending from the back of the clamp block 306". The extension 355 has a rear wall 356 with an opening or hole 358 therein which is aligned with the head of the bolt 342 to enable operation of the clamp assembly 300". The extension 354 also includes a vertical hole 360 extending from the top surface through the bottom surface of the extension 354. The bore 360 is configured and dimensioned to receive the post of a lever actuated quick release device 224. The quick release device 224 is constructed and functions similarly to the quick release device described in U.S. Pat. No. 6,095,611, which is incorporated herein by reference.

The clamp block 306" is substantially the same as the clamp block 306 (FIG. 10). However, the clamp block 306" does not include a support post. Hence, the mounting clamp 300", with the associated quick release device 224, can be employed with the support mechanism 200 of FIG. 9, which does not rely on support posts 226 to mount the wheelchair back in place between the wheelchair posts P.

It will be appreciated by those skilled in the art that the foregoing written description, representative embodiments and accompanying drawings are intended to be illustrative of the general concept of the invention and should not be construed to limit the claims in any manner. Although only the clamp of FIG. 13 is shown to include a knob or grip, it will be apparent that the knob or grip could be provided with any or all of the clamp assemblies of FIGS. 10-17. This example is merely illustrative.

The invention claimed is:

1. An adjustment apparatus for a wheelchair back comprising:
    a bracket assembly connectable to a surface of a wheelchair back and a support connected to the bracket assembly adapted to be removably mounted to a post of a wheelchair;
    a tilt assembly between the bracket assembly and the support for rotation and adjustment of the angular orientation of wheelchair back relative to the post of the wheelchair, the tilt assembly comprising a first grooved surface adjacent the bracket assembly and a second grooved surface adjacent the support, the recited grooved surfaces being rotatable about each other such that the wheelchair back can rotate about the recited surfaces for adjustment and interlocked when the wheelchair back is secured in a desired angular orientation;
    a slide assembly for adjusting the position of one of the support and the wheelchair back relative to the other along a generally horizontal path; and
    a single adjustment apparatus for securing the wheelchair back in a desired position.

2. The adjustment apparatus of claim 1 wherein the support comprises a hanger apparatus configured to engage a mounting clamp assembly on the wheelchair post.

3. The adjustment apparatus of claim 2 wherein the hanger includes a hook for the removable attachment of the hanger to a post on the mounting clamp assembly.

4. The adjustment apparatus of claim 1 wherein the single adjustment apparatus comprises a fastener operatively connecting the tilt assembly and the slide mechanism to the bracket whereby operation of the fastener allows for operation of both the tilt assembly and the slide mechanism to selectively adjust the angular and horizontal position of the wheelchair back.

5. The adjustment apparatus of claim 4 wherein the bracket comprises a forward wall, a rear wall, and an opening in the forward wall through which the fastener extends, the forward wall of the bracket facing the first surface of the tilt assembly.

6. The adjustment apparatus of claim 5 wherein the first surface comprises a disk having an outer surface, an inner surface, and a hole through which the fastener extends, the outer surface of the disk facing the second surface such that the disk and the second surface can rotate with respect to each other when the adjustment mechanism is in a loosened position.

7. The adjustment apparatus of claim 6 wherein the inner surface of the disk engages the forward wall of the bracket, the inner surface of the disk and the forward surface of the bracket having complementary grooved configurations whereby, when the inner surface of the disk and the bracket forward wall are in abutting relationship, rotational and horizontal movement of the inner disk relative to the bracket is substantially prevented by engagement of the complementary grooved configurations.

8. The adjustment apparatus of claim 1 wherein the second grooved surface of the tilt assembly comprises a disk having a grooved surface.

9. An adjustment apparatus for a wheelchair back comprising:
- a bracket connectable to a surface of a wheelchair back and a support connected to the bracket assembly adapted to be removably mounted to a post of a wheelchair, the bracket comprising a forward wall, a rear wall, and an opening in the forward wall through which a fastener extends, the forward wall of the bracket facing a first surface of a tilt assembly positioned between the bracket assembly and support for rotation and adjustment of the angular orientation of wheelchair back relative to the post of the wheelchair, the tilt assembly comprising a first surface adjacent the bracket and a second surface adjacent the support, the recited surfaces engaging each other such that the wheelchair back can rotate about the recited surfaces;
- a slide mechanism for adjusting the position of one of the support and the wheelchair back relative to the other along a generally horizontal path; and
- wherein the fastener operatively connects the tilt assembly and the slide mechanism to the bracket whereby operation of the fastener allows for operation of both the tilt assembly and the slide mechanism to selectively adjust the angular and horizontal position of the wheelchair back.

10. The adjustment apparatus of claim 9 wherein the first surface of the tilt assembly comprises a disk having an outer surface, an inner surface, and a hole through which the fastener extends, the outer surface of the disk facing the second surface such that the disk and the second surface can rotate with respect to each other when the adjustment mechanism is in a loosened position.

11. The adjustment apparatus of claim 10 wherein the inner surface of the disk engages the forward wall of the bracket, the inner surface of the disk and the forward surface of the bracket having complementary grooved configurations whereby, when the inner surface of the disk and the bracket forward wall are in abutting relationship, rotational and horizontal movement of the inner disk relative to the bracket is substantially prevented by engagement of the complementary grooved configurations.

* * * * *